United States Patent
Dasgupta et al.

(10) Patent No.: US 11,972,335 B2
(45) Date of Patent: Apr. 30, 2024

(54) SYSTEM AND METHOD FOR IMPROVING CLASSIFICATION IN ADVERSARIAL MACHINE LEARNING

(71) Applicant: The Government of the United States of America, as represented by the Secretary of the Navy, Arlington, VA (US)

(72) Inventors: Prithviraj Dasgupta, Springfield, VA (US); Joseph B. Collins, McLean, VA (US)

(73) Assignee: The Government of the United States of America, as represented by the Secretary of the Navy, Arlington, VA (US)

(*) Notice: Subject to any disclaimer, the term of this patent is extended or adjusted under 35 U.S.C. 154(b) by 324 days.

(21) Appl. No.: 17/188,923

(22) Filed: Mar. 1, 2021

(65) Prior Publication Data
US 2021/0326664 A1 Oct. 21, 2021

Related U.S. Application Data

(60) Provisional application No. 63/011,104, filed on Apr. 16, 2020.

(51) Int. Cl.
*G06N 20/20* (2019.01)
*G06F 18/2415* (2023.01)
*G06F 18/2431* (2023.01)

(52) U.S. Cl.
CPC ....... *G06N 20/20* (2019.01); *G06F 18/24155* (2023.01); *G06F 18/2431* (2023.01)

(58) Field of Classification Search
CPC . G06N 20/20; G06N 5/01; G06N 7/01; G06F 18/24155; G06F 18/2431; G06F 18/2413; G06F 18/285
See application file for complete search history.

(56) References Cited

U.S. PATENT DOCUMENTS

| | | | |
|---|---|---|---|
| 8,869,277 B2 | 10/2014 | Radinsky et al. | |
| 9,665,713 B2 | 5/2017 | Avasarala et al. | |
| 2012/0084859 A1* | 4/2012 | Radinsky | G06F 21/56 |
| | | | 707/E17.046 |

(Continued)

OTHER PUBLICATIONS

Chiew, K.L., Tan, C.L., Wong, K., Yong, K.S. and Tiong, W.K., 2019. A new hybrid ensemble feature selection framework for machine learning-based phishing detection system. Information Sciences, 484, pp. 153-166.*

(Continued)

*Primary Examiner* — Zhitong Chen
(74) *Attorney, Agent, or Firm* — US Naval Research Laboratory; William P. Ladd

(57) ABSTRACT

Methods and systems are provided for automatic classification of information in an adversarial machine learning setting. For example, a learner that includes multiple classifiers may perform data classification automatically. Each classifier may be trained with adversarial data of a different strength. For a given query to be classified, the learner is configured to intelligently select a classifier that is commensurate with the adversarial strength of the data inside the query, without explicit knowledge of that data or its adversarial strength.

20 Claims, 9 Drawing Sheets

(56) References Cited

U.S. PATENT DOCUMENTS

2021/0241169 A1* 8/2021 Gupta .................... G06N 20/00

OTHER PUBLICATIONS

Großhans, M., Sawade, C., Brückner, M. and Scheffer, T., 2013, May. Bayesian games for adversarial regression problems. In International Conference on Machine Learning (pp. 55-63). PMLR.*

Alfeld et al., "Explicit Defense Actions Against Test-Set Attacks", Proceedings of the Thirty-First AAAI Conference on Artificial Intelligence, Feb. 4-9, 2017, 7 pages.

Bagnall et al., "Training Ensembles to Detect Adversarial Examples", arXiv:1712.04006, Dec. 11, 2017, 5 pages.

Browne et al., "A Survey of Monte Carlo Tree Search Methods", IEEE Transactions on Computational Intelligence and AI in Games, vol. 4, No. 1, Mar. 2012, 49 pages.

Bruckner et al. "Static Prediction Games for Adversarial Learning Problems", Journal of Machine Learning Research 13, 2012, 38 pages.

Bulo et al., "Randomized Prediction Games for Adversarial Machine Learning," IEEE Transactions on Neural Networks and Learning Systems, 28 (11), Nov. 2017, 13 pages.

Dalvi et al., "Adversarial Classification", Proceedings of the Tenth ACM SIGKDD International Conference on Knowledge Discovery and Data Mining, Aug. 2004, 10 pages.

Dasgupta et al., "A Survey of Game Theoretic Approaches for Adversarial Machine Learning in Cybersecurity Tasks", AI Magazine, vol. 40, No. 2, 2019, 13 pages.

Dasgupta et al., "Playing to Learn Better: Repeated Games for Adversarial Learning with Multiple Classifiers", arXiv:2002.03924v1, Feb. 10, 2020, 7 pages.

Dong et al., "Strategic Classification from Revealed Preferences", Proceedings of the 2018 ACM Conference on Economics and Computation, Jun. 2018, 16 pages.

Globerson et al., "Nightmare at Test Time: Robust Learning by Feature Deletion", Proceedings of the 23rd International Conference on Machine Learning, 2006, 8 pages.

Goodfellow et al., "Generative Adversarial Nets", Advances in Neural Information Processing Systems, 2014, 9 pages.

Goodfellow et al., "Explaining and Harnessing Adversarial Examples", arXiv:1412.6572, Mar. 20, 2015, 11 pages.

Grosshans et al., "Bayesian Games for Adversarial Regression Problems", Proceedings of the 30th International Conference on Machine Learning, vol. 28, 2013, 9 pages.

Harsanyi, "Games with Incomplete Information Played by 'Bayesian' Players, I-III", Management Science, vol. 14, No. 3, Nov. 1967, 25 pages.

Kariyappa et al., "Improving Adversarial Robustness of Ensembles with Diversity Training", arXiv:1901.09981, Jan. 28, 2019, 10 pages.

Kurakin et al., "Adversarial Machine Learning at Scale", arXiv:1611.01236v2, Feb. 11, 2017, 17 pages.

Li et al., "Enhancing Robustness of Deep Neural Networks Against Adversarial Malware Samples: Principles, Framework, and AICS'2019 Challenge", arXiv:1812.08108v3, Sep. 16, 2020, 9 pages.

Liang et al., "Deep Text Classification Can Be Fooled", Proceedings of the 27th International Joint Conference on Artificial Intelligence, 2018, 8 pages.

Madry et al., "Towards Deep Learning Models Resistant to Adversarial Attacks", arXiv:1706.06083v4, Sep. 4, 2019, 28 pages.

Mei et al., "Using Machine Learning to Identify Optimal Training-Set Attacks on Machine Learners", Proceedings of the Twenty-Ninth AAAI Conference on Artificial Intelligence, 2015, 7 pages.

Schlenker et al., "Deceiving Cyber Adversaries: A Game Theoretic Approach", Proceedings of the 17th International Conference on Autonomous Agents and Multiagent Systems, International Foundation for Autonomous Agents and Multiagents Systems, Jul. 2018, 9 pages.

Shoham et al., "Multiagent Systems—Algorithmic, Game-Theoretic, and Logical Foundations", Cambridge University Press, 2009, 532 pages.

Tramer et al., "Ensemble Adversarial Training: Attacks and Defenses", arXiv:1705.07204v5, Apr. 26, 2020, 22 pages.

Wolpert, "The Supervised Learning No-Free-Lunch Theorems", Soft Computing and Industry, Springer, 2002, 20 pages.

Yuan et al., "Adversarial Examples: Attacks and Defenses for Deep Learning", IEEE Transactions on Neural Networks and Learning Systems vol. 30, Issue 9, Sep. 2019, 20 pages.

Zhang et al., "Character-level Convolutional Networks for Text Classification", Advances in Neural Information Processing Systems, 2015, 9 pages.

Vorobeychik et al., "Adversarial Machine Learning", Synthesis Lectures on Artificial Intelligence and Machine Learning, Aug. 2018, Abstract, 1 page.

* cited by examiner

400

402 — Classifier makes a mistake, mistake consequences are LOW (e.g., legitimate software quarantined as malware)

| Classifier type → | 0 | 1 | 2 |
|---|---|---|---|
| Adv type 0 | -292.5 | -477.36 | -637.5 |
| Adv type 1 | -493.75 | -389.27 | -543.75 |
| Adv type 2 | -695 | -602.36 | -475 |
| Adv type 3 | -896.25 | -815.45 | -706.25 |

406 — Classifier does correct classification, gets usual (small) reward (e.g., malware identified as malware)

| Classifier type → | 0 | 1 | 2 |
|---|---|---|---|
| Adv type 0 | 209.375 | 58.315 | -165.625 |
| Adv type 1 | 327.5 | 403.54 | 187.5 |
| Adv type 2 | 308.75 | 366.63 | 418.75 |
| Adv type 3 | 290 | 329.72 | 350 |

404 — Classifier makes a mistake, mistake consequences are HIGH (e.g., malware mistaken as legitimate software and allowed access to high security system)

| Classifier type → | 0 | 1 | 2 |
|---|---|---|---|
| Adv type 0 | -292.5 | -477.36 | -637.5 |
| Adv type 1 | -1478.75 | -785.675 | -1368.75 |
| Adv type 2 | -2430.88 | -1622.53 | -840.625 |
| Adv type 3 | -3577.5 | -2635.57 | -1693.75 |

408 — Classifier does correct classification, gets usual (small) reward (e.g., legitimate software identified as legitimate software)

| Classifier type → | 0 | 1 | 2 |
|---|---|---|---|
| Adv type 0 | 209.375 | 58.315 | -165.625 |
| Adv type 1 | 190.625 | 271.405 | 63.625 |
| Adv type 2 | 171.875 | 234.495 | 296.875 |
| Adv type 3 | 153.125 | 197.585 | 228.125 |

FIG. 4

SYSTEM AND METHOD FOR IMPROVING CLASSIFICATION IN ADVERSARIAL MACHINE LEARNING

CROSS-REFERENCE TO RELATED APPLICATIONS

This application claims the benefit of priority based on U.S. Provisional Patent Application No. 63/011,104 filed Apr. 16, 2020, the entirety of which is incorporated herein by reference.

FEDERALLY-SPONSORED RESEARCH AND DEVELOPMENT

The United States Government has ownership rights in this invention. Licensing inquiries may be directed to Office of Technology Transfer, US Naval Research Laboratory, Code 1004, Washington, DC 20375, USA; +1.202.767.7230; techtran@nrl.navy.mil, referencing Navy Case Number 112566-US2.

BACKGROUND

Classification of information into one of different categories is an important task in many applications, including malware detection, electronic mail (email) spam filtering, image and video identification, sentiment analysis in social media posts, etc. A classification task may be automated using a computer generated tool called a classification engine or a classifier that is built using an artificial intelligence based technique called supervised learning.

A simple classification example includes classification of email into one of two categories, spam versus non-spam. The training data for such classification may include several instances of email that have been labeled appropriately as spam and non-spam. When the classifier is able to achieve a substantially high degree of accuracy on unlabeled emails given as test data, its training is considered complete. After that, the classifier may operate automatically as a spam filter to categorize incoming emails as spam or non-spam. It is burdensome and costly to train and operate a classifier. For example, there is a need to acquire training data for the classification task, clean and structure the data into an appropriate format for training, hire human experts to label the data correctly, and perform computations for the training process. In addition, computational resources (e.g., memory and processing power) are needed for operating the classifier.

SUMMARY

This Summary is intended to introduce, in simplified form, a selection of concepts that are further described in the Detailed Description. This Summary is not intended to identify key or essential features of the claimed subject matter, nor is it intended to be used as an aid in determining the scope of the claimed subject matter. Instead, it is merely presented as a brief overview of the subject matter described and claimed herein.

Embodiments described herein are related to a learner that automatically classifies information provided to it into one of multiple categories. The learner includes multiple classifiers with different degrees of hardening such that each classifier is trained with adversarial data of a different strength. For a given query to be classified, the learner is configured to intelligently select a classifier that is commensurate with the query type to classify the query.

An embodiment is directed to a method for operating a learner that maintains a classifier ensemble for data classification. The method includes receiving a query for classification from an adversary having an adversary type that corresponds to an adversarial strength that is used to perturb the data in the query, the adversary type not being directly known by the learner. The method further includes determining a strength of the adversary based on a predicted adversary type distribution. The method also includes selecting a classifier from the classifier ensemble that has been trained with at least one of clean data or adversarial data, the classifier having a classification strength that is commensurate with the determined strength of the adversary. The method further includes classifying the query using the selected classifier.

Another embodiment is directed to a method for training a classifier ensemble for classifying data. The method includes receiving clean data and perturbing the clean data to generate a first adversarial data type of a plurality of adversarial data types, each adversarial data type corresponding to an adversarial strength. The method further includes training a first classifier with the clean data, the first classifier having a first classification strength. The method also includes training a second classifier with the first data type, the second classifier having a second classification strength.

Yet another embodiment is directed to a system that includes a processor and memory that stores computer program logic for execution by the processor, the computer program logic comprising a classifier ensemble. The classifier ensemble comprises a first classifier that is trained with clean data, the first classifier having a first classification strength, and a second classifier that is trained with a first adversarial data type, the second classifier having a second classification strength.

BRIEF DESCRIPTION OF THE DRAWINGS

FIG. 4 depicts a predefined utility table according to an example embodiment.

DETAILED DESCRIPTION

Definitions

Figure 1:
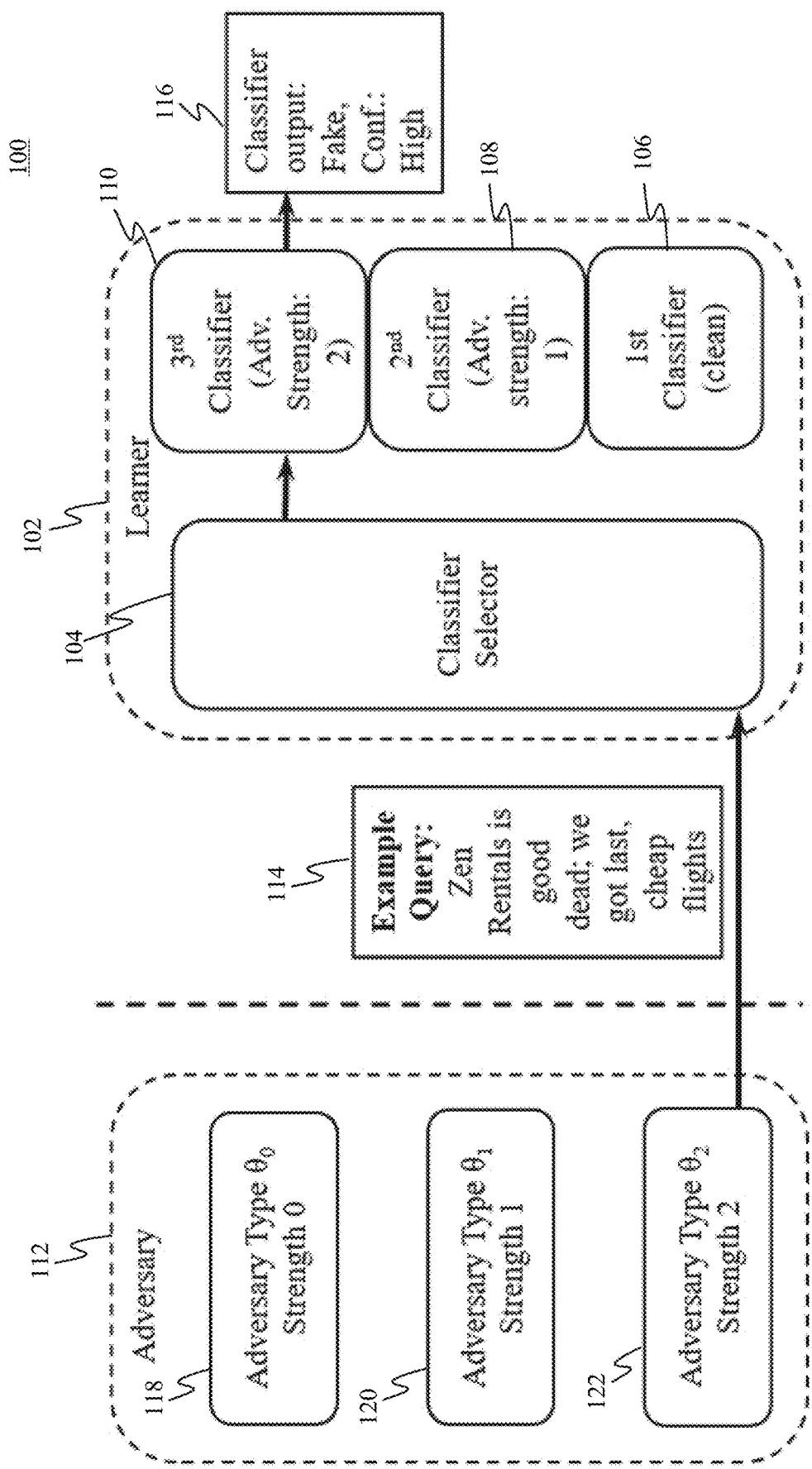
FIG. 1 depicts a classification system, according to an example embodiment.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a feature, structure, or characteristic is described in connection with an embodiment, it is submitted that it is within the knowledge of one skilled in the art to effect such feature, structure, or characteristic in connection with other embodiments whether or not explicitly described.

In describing and claiming the disclosed embodiments, the following terminology will be used in accordance with the definition set forth below.

As used herein, the singular forms "a," "an," "the," and "said" do not preclude plural referents, unless the content clearly dictates otherwise.

As used herein, the term "and/or" includes any and all combinations of one or more of the associated listed items.

As used herein, the term "about" or "approximately" when used in conjunction with a stated numerical value or range denotes somewhat more or somewhat less than the stated value or range, to within a range of ±10% of that stated.

Terminology used herein should not be construed as being "means-plus-function" language unless the term "means" is expressly used in association therewith.

Overview

Adversarial machine learning (ML) is important in machine-learning based prediction systems such as email spam filters, online recommendation systems, text classifier and sentiment analysis used on social media, and automatic video and image classifiers. The main problem in adversarial learning is to prevent an adversary from bypassing an ML based predictive model such as a classifier by sending engineered, malicious data instances called adversarial examples. These evasion attacks could enable a malicious adversary to subvert the ML model of the learner and possibly access critical resources being protected by the learner. For instance, in the context of malware detection, an adversary may surreptitiously insert ill-formed Portable Document Format (PDF) objects into a valid PDF file to convert it into a malware that may bypass a ML based malware detector and subsequently crash an Internet browser attempting to read the corrupted PDF file. Techniques have been used on a single classifier to address adversarial learning. For example, classifier hardening is an approach that refines the decision boundary of the classifier over time via re-training with adversarial data. However, improving the robustness of a single classifier remains an open problem and the classifier hardening approach is still susceptible to adversarial attacks.

Moreover, classifier hardening techniques do not explicitly align budgets and/or resources (e.g., adversarial training data acquisition, time, and computing resource) with the data being classified. For instance, for classifying clean data, a classifier hardened over several batches of adversarial data might be excessive, as a classifier that is not hardened might achieve similar performance.

Most existing classification techniques employ a single classifier. However, training only one classifier repeatedly makes the classifier more complex (e.g., a deep neural network classifier may have thousands of parameters and is therefore very large in size) and prone to failure, as well as incurs more time and computational resources (e.g., processing hardware, processing power).

Even when multiple classifiers are used, there are issues with the current techniques. One current approach to classification requires inspection of the properties of a received query using third party tools (e.g., using a file categorizer to identify the format of the input data from its structure and attributes), and then a classifier that has been trained to classify queries with the determined properties is deployed. For example, for a query that is an executable file, the classifier that has been trained to classify executable files would be deployed. However, this approach is vulnerable to data spoofing, where the adversary may disguise the properties of the query to misguide the classifier. In addition, this approach does not account for the costs, penalties and rewards for the classifier and adversary.

Another current approach to classification provides multiple classifiers for classification. However, this approach requires more time and computation as all classifiers are used for classifying a query. The outputs of the classifiers are ranked and the top ranked classifier is selected for the final output. Another approach selects a subset of classifiers that are most distinct from each other for the classification. This approach focuses on the properties of the classifiers rather than the properties of the query. However, this approach leads to a less accurate classification system.

It is known that there is not a single classifier that can be optimal for all classification tasks and a combination of classifiers may outperform the best individual classifier. Accordingly, embodiments are described herein that improve classification in adversarial machine learning without deteriorating classification accuracy by using a learner that includes an ensemble of classifiers. Each classifier in the ensemble may be hardened separately against adversarial attacks of different strength to improve the training and operation of the learner. The classifier ensemble may be trained and operated at a lower budget while maintaining similar classification accuracy as state-of-the-art classifiers. Thus, these embodiments enable data classification to be performed faster and more efficient, thereby improving the underlying computing system that implement the embodiments in terms of computing speed and resources.

A challenge with using multiple classifiers is to determine the appropriate pairing between a query, with either clean or adversarial data of different attack or adversarial strengths, sent to the learner and a commensurate classifier from the ensemble of classifiers to handle the query most effectively, e.g., with the least likelihood of classification errors while aligning classifier hardening costs with the adversarial strength. Another challenge is that the classifier is not aware whether the query is from an attacker and/or its adversarial strength. The techniques described herein address these challenges with a game theoretic framework called a repeated Bayesian sequential game with self play between a learner and an adversary model. The outcome of the game is a strategic selection of an appropriate classifier for the learner. The Bayesian framework enables the realization of several practical aspects of the learner-attacker interactions, including uncertainty of the learner about the strengths of different attacks, respective costs to the learner and the attacker to train the classifier and to generate adversarial examples, and rewards and penalties to the attacker and the learner for successes in the attacks and defenses, respectively. This Bayesian framework also enables asymmetric interactions between the learner and its clients for both non-competitive (legitimate client with clean queries) and competitive (attackers with adversarial queries) settings.

The classification techniques provided herein send a query to only one classifier that is intelligently selected based on both properties of the classifier and the query. Thus, these techniques enable accurate automatic classification of information in a time efficient and more accurate manner at a lower budget by avoiding the redundant activation of all available classifiers to determine temporary outputs and rank them. By training the classifiers separately, less expenditure per classifier is incurred, in terms of training data, costs, and time. This also yields an individual classifier that is lower in complexity and size, resulting in lower costs to deploy after training. The time required by a classifier to classify a query depends on the size and complexity of the classifier as well as the time required to load the classifier into the computer's working memory. A classifier that is smaller in size and less complex may reduce the time required for classification.

In addition, the classification techniques provided herein are data agnostic and adaptable across data modalities, i.e., the core functionality may be generalized across different types of data (e.g., image, text) for multiple applications. Some applications include cyber security where downloaded software may be categorized as malware or benign software, image classification where objects in pictures, still or moving, may be classified as missiles or friendly air traffic, or social media where content in user postings may be determined to be valid or fake news.

In an example embodiment, a classifier ensemble is able to reduce the build and operation costs (e.g., data processing, time, computing resources) by 30-40% while maintaining similar classification accuracy as a current state-of-the art classifier. The classifier ensemble implements the Bayesian framework to classify textual data from online customer product reviews as positive or negative. This is merely an example, other implementations are possible with other types of data having similar or different margins of improvement.

Example Embodiments

A classification task may be automated using a computer component called a classification engine or a classifier that is built using an artificial intelligence (AI) based technique called supervised machine learning. Each piece of information that is provided to the classifier is called a data instance. Depending on its features, a data instance belongs to one of different possible categories. The category of a data instance is usually ascertained by a human and is called a ground truth label. Given a data instance whose ground truth label is not provided, the objective of the classifier is to correctly determine the category to which a data instance belongs and assign that category as the predicted label for the data instance. To achieve this, a technique called classifier training is used where the classifier is provided with several labeled data instances, called training data, belonging to different categories. During training, the classifier is periodically provided with unlabeled data instances, called test data. The training is considered complete when the number of errors the classifier makes in classifying test data is substantially low. The corresponding metric is called the classifier's accuracy. Post training, the classifier may be deployed for operation, where it is given unlabeled data instances called queries, and it is configured to output the category of the query data instance, with a similar degree of accuracy as achieved for the test data instances.

Embodiments for data classification may be implemented in a variety of environments. For example, FIG. 1 depicts a classification system 100 for classifying data, according to an example embodiment. Classification system 100 includes learner 102 having an intelligent classifier selector 104 and a classifier ensemble that includes a first classifier 106, a second classifier 108, and a third classifier 110. Classification system 100 may further includes adversary 112 configured to submit query 114 to learner 102 for classification. Classification system 100 may include more or fewer components than shown in FIG. 1. For example, classification system 100 may include memory for storing the classifier ensemble or network interfaces and/or networks over which data may be transmitted or received.

Learner 102 is configured to use classifier selector 104 to select an appropriate classifier from the classifier ensemble, such as a classifier that is commensurate with adversary 112, to classify query 114 and provide an output 116. Each classifier in the classifier ensemble may have a classifier type that corresponds to a type or strength of adversarial data with which the classifier has been trained. This strength may also be referred to herein as classifier or classification strength. For example, in an embodiment, first classifier 106 may be trained with clean data, which is essentially adversarial data of strength 0, second classifier 108 may be trained with adversarial data of strength 1, and third classifier 110 may be trained with adversarial data of strength 2. Thus, first classifier 106, second classifier 108, and third classifier 110 may respectively have a first, second and third classification strength. While three classifiers are depicted in FIG. 1, learner 102 may include just two classifiers or as many classifiers as necessary for a particular data set, application, or other factors. Output 116 may include a binary classification result or a predicted label or category, such as true or false, 0 or 1, yes or no, valid or fake, malware or benign software, threat or not a threat. Other output formats are possible, such as a range for the classification result, including low, medium or high. In addition, output 116 may include a confidence level, e.g., low confidence or high confidence or a percentage, to indicate how certain or how much faith learner 102 has in the classification result.

Adversary 112 may be one of multiple types, each adversary type corresponding to a different adversarial data type or strength. For example, adversary 112 may have a first adversary type 118 ($\theta_0$) corresponding to an adversarial strength 0, a second adversary type 120 ($\theta_1$) corresponding to strength 1, or a third adversary type 122 ($\theta_2$) corresponding to strength 2. The adversarial strength is used to perturb the data in the query. For example, adversary type $\theta_0$ corresponding to strength 0 may be clean data that has not been perturbed. Adversary type $\theta_1$ corresponding to strength 1 may be perturbed up to a first amount or first percentage, according to a formula or equation, or by one character, etc. Third adversary type 112 corresponding to strength 2 may be perturbed up to a second amount or percentage, according to a formula or equation, or by two characters, etc. The strength of the perturbation or adversary is not known by learner 102 from the outset, and learner 102 is configured to determine this information using classifier selector 104. In an embodiment, learner 102 determines the adversary strength by modeling the uncertainty of the perturbation strength as a type of adversary. For example, adversary type $\theta_i$ denotes that adversary 112 used perturbation strength i inside the query. Learner 102 also does not know $\theta_i$, but learner 102 may estimate a probability distribution over the set of types $\Theta=\{\theta_i\}$ through self play. A probability distribution is a mathematical function that gives the probabilities of occurrence of different possible outcomes (e.g., adversary types) for an experiment. For example, learner 102 may estimate that the most likely adversary type is type 2 ($\theta_2$) from three possible types $\{\theta_0, \theta_1, \theta_2\}$ with the possible probability distribution over types of (0.1, 0.1, 0.8).

In an embodiment, for a given query (e.g., query 114 in FIG. 1), learner 102 is configured to select an appropriate classifier from the classifier ensemble such that the selected classifier's capability to correctly classify the query, and training and operational costs are aligned with the adversarial strength of the data in the query. For example, if the query contains clean data, learner 102 is configured to select a classifier that is trained to classify clean data (e.g., first classifier 106 in FIG. 1), without having direct information that the data inside the query is clean. As another example, as shown in FIG. 1, for query 114 of "Zen Rentals is good dead; we got last, cheap flights" from adversary 112, classifier selector 104 is configured to select third classifier 110 to classify query 114 and provide output 116 declaring query 114 as a "fake" review, with high confidence.

In an embodiment, learner 102 (L) may receive data instances as queries (e.g., query 114 in FIG. 1) from an attacker or adversary 112 (A) in a supervised learning setting for binary classification. The interaction between L and A may be represented as a two-player Bayesian game for adversarial learning with multiple classifiers, different attack strengths and repeated interactions between the players L and A. In a Bayesian game, players may have incomplete information about the other players. For example, learner 102 does not know the adversary type of adversary 112, but it may have beliefs about the adversary types that are represented by a probability distribution over the possible adversary types. Because of the incomplete information, one or more players may be unsure of the type of another player. The players may update their beliefs according to Bayes' rule that describes the probability of an event based on prior knowledge of conditions that might be related to the event. For example, the belief a first player holds about a second player's type might change according to the first player's type.

The Bayesian game components are as follows. $X^{ev}$ may be denoted as a set of queries, and $X^{ev}$ may be referred to as a clean query set. $X=(x, y)$, $X \in X^{ev}$ denotes a query data instance, where $x=\{x_1, x_2, \ldots\}$ is its set of attributes or features and $y \in \{0,1\}$ is its ground truth label.

Adversary

Adversary A may send either clean or adversarial data as queries; the latter is generated by perturbing clean data using a perturbation function $\delta: x \to x$. A may use different perturbation functions $\delta_i$, $i=0, 1, 2, \ldots$, where i denotes the strength of the perturbation. For example, perturbation strength may correspond to the number of features of x that are modified to convert it into an adversarial instance. $\delta_i(x)$ denotes the adversarial data generated with perturbation strength i and $\delta_{i+1}$ is a stronger perturbation than $\delta_i$. Perturbing x does not change its ground truth label, y. For an example, a clean textual data instance, "The item we got was broken; the online seller did not give a refund," may become "The item we got was broken; the online seller did lot give a refund" with perturbation strength 1, and "The item we got was broken; the online seller did lots, gave a refill" with perturbation strength 2. For notational convenience, clean data may be referred to as $x=\delta_o(x)$. An action for A is to select a $\delta_i$, use it to convert clean data instance x into an adversarial instance $\delta_i(x)$, and send the adversarial instance to L.

Learner

Learner L may receive a query data instance $\bar{x}$ and is configured to correctly predict its category. L is neither aware of the perturbation strength i of $x^{\delta_i}$ inside the data, nor is it aware of $\bar{y}$, the ground truth label of $\bar{x}$. L may use a set of classifiers, $L_j$, $j=0, 1, 2, \ldots$ for its prediction task. $L_j$ implements a classification, $L_j: x \to \{0,1\}$ that outputs a category given the features of the query data. Classifier $L_j$ is adversarially trained using training data $X^{tr,\delta_j} \notin X^{ev}$, where $\delta_j$ denotes the perturbation strength of the training data. It is assumed that $L_{j+1}$ is a stronger classifier than $L_j$, thus, for a query x, $L_{j+1}$ has a higher confidence in its output than $L_j$, or mathematically, $P(L_{j+1}(x)=y) \geq P(L_j(x)=y)$. L is configured to select a classifier $L_j$ and use it to classify the data instance sent by A. The action set of L may be denoted as $Ac_L=\{L_0, L_1, L_2 \ldots\}$. Let $\Pi(Ac_L)$ be the set of probability distributions over $Ac_L$. $S_L \in \Pi(A_{C_L})$ denotes a strategy for L and $S_L(L_j)$ the probability of selecting $L_j$ under strategy $S_L$. Again, note that L is not aware of the perturbation $\delta_i$ that has been used by A on the query data instance, $\bar{X}$ that it receives. To model this uncertainty about its opponent, L may use epistemic types for A. A's type $\theta_i$ denotes that A uses perturbation strength i to create $\bar{x}$, i.e., $\bar{x}=x_{\theta_i}=\delta_i(x)$. $\Theta_A=\{\theta_i\}$ is a set of types for A, and $p: \Theta_A \to [0,1]^{|\Theta_A|}$ denotes a probability distribution over these types. $\Theta_A$ is known to L, and p( ) may be calculated by L. But $\theta_i$, the exact realization of A's type (in other words, the perturbation strength used to create $\bar{x}$) is not known to L when it receives $\bar{x}$ from A.

Utilities

After classifying a query, L and A may receive utilities. Utilities are numeric values assigned by each player to the outcomes from the players' joint actions in a game. Each player may then preferentially rank its joint outcomes and select a suitable action such as a utility maximizing action. A player's utility for a joint action is given by the difference between the value that it gets when the query is classified, either correctly or incorrectly, minus the cost it incurs when this happens. L's utility for classifier $L_j$ with query data $\bar{x}$ and ground truth label $\bar{y}$, when the query data's strength is $\theta_i$ is given by:

$$U_L(L_j,\bar{x},\theta_i)=P(L_j((\bar{x})=\bar{y})|\theta_i)v_L(\theta_i)+ P(L_1((\bar{x})\neq\bar{y})|\theta_i)\bar{v}_L(\theta_i)-c_{L_j} \qquad (1a)$$

where, $P(L_j((\bar{x})=\bar{y}))$ and $(L_j((\bar{x})\neq\bar{y}))$ represent the probabilities that L does correct and incorrect predictions of query $\bar{x}$, respectively; $v_L(\theta_i)$ and $\bar{v}_L(\theta_i)$ are the values that L derives from the correct and incorrect predictions of the query, respectively; and $c_{L_j}$ is the cost of using classifier $L_j$.

Using equation 1a, L's utility for strategy $S_L$, which is a probability distribution over different $L_j$-s, may be written as $U_L(S_L,\bar{x},\theta_i)=\Sigma_{L_j}S_L(L_j)U_L(L_j,\bar{x},\theta_i)$. Again, note that L is not aware of A's type $\theta_i$ (amount of perturbation in $\bar{x}$) when it receives $\bar{x}$. Therefore, L calculates an expected utility over A's possible types, $\Theta_A$, using A's type distribution p( ), as given below.

$$EU_L(S_L, \bar{x}_0, \theta_A, p()) = \sum_{\theta_i \in \Theta_A} p(\theta_i) U_L(S_L, \bar{x}, \theta_i) \qquad (1b)$$

where $P(L_j((\bar{x})=\bar{y})|\theta_i)$ is the probability that L makes a correct prediction given $\bar{x}$ being generated using $\theta_i$; $v_L(L_j,\theta_i)$ is the value for L from classifying $\bar{x}$ using $L_j$; and $C_{L_j}$ is the cost of using classifier $L_j$.

In adversarial settings, it may be assumed that the adversary is aware of the learner's prediction model, e.g., model parameters of the learner's classifier. In an embodiment, adversary 112 is assumed to know learner 102's strategy $S_L$. A's utility for query data $\bar{x}$ and ground truth label $\bar{y}$, for L's strategy $S_L$ and its own type $\theta_i$ is given by:

$$U_A(S_L, \bar{x}, \theta_i) = \sum_{L_j} S_L(L_j)(P(L_j(\bar{x}) \neq \bar{y})v_A(L_j, \theta_i) - c_{\theta_i}), \quad (2)$$

where $P(L_j(\bar{x})\neq\bar{y})$ represents the probability that L makes a mistake in prediction (in other words, A's adversarial perturbation of clean data was successful) and $v_A(L_j,\theta_i)$ is the value that A derives from sending the query data $x_{\theta_i}$, when L's action is $L_j$, and $c_{\theta_i}$ is A's cost for generating adversarial data type $\theta_i$ or perturbation strength $\theta_i$.

Bayesian Sequential Game

Using the above actions and utility functions, a Bayesian sequential game between L and A may be represented as $\Gamma=[N, Ac, U, \Theta_A, p()]$, where $N=\{L, A\}$ is the set of players, $Ac=Ac_L\times\Theta_A$ is the set of joint action-types of L and A (given in equations 1 and 2), $\Theta_A$ and $p()$ are the set of probability distribution over those types, as defined before.

In an embodiment, L is configured to determine a suitable strategy $S_L^*$, and A is configured to determine a suitable type $\theta_j^*$. To determine the strategy (using equation 1b), L may need to determine the value of $p()$, the probability distribution over A's types. This may be accomplished with a technique called self play with repeated plays of the Bayesian game, which is referred to as a repeated Bayesian sequential game (RBSG).

Repeated Bayesian Sequential Game and Self Play

The objective of L is to determine a suitable strategy $S_L^*$ to play against A that would improve its expected utility by deploying an appropriate classifier that has been hardened commensurate to the strength of the perturbation used by A. In an embodiment, L is configured to use self play, where L and A play the Bayesian sequential game, $\Gamma$, repeatedly. That is, L is configured to build adversary models of different strengths for A, then L simulates sending queries of different strengths from the adversary models to itself. For the sake of legibility, the notation of A is used herein to denote L's self play adversary. The repeated interactions between L and A may be represented as a game tree with sequential moves between them. A node in the game tree denotes a player's turn to make a move. In a move, a player selects an action from its action set. For example, the action set for L may include selecting a classifier and using it to classify the incoming query instance, and the action set for A may include selecting an adversary type having an associated perturbation strength, converting clean data to perturbed data having the selected perturbation strength, and sending the perturbed data to L. L and A make alternate moves with L moving first, and the best strategy is selected at each turn. A pair of moves by L and A corresponds to an instance of the Bayesian sequential game, $\Gamma$, that may be implemented as algorithm 1 below.

Algorithm 1: game-play ( )

1   Select $S_L^*$ using current belief of $\hat{p}$ and $\theta_j^*$ (equation 3 or 4)
2   Calculate utilites received: $\hat{u}_L$ and $\hat{u}_A$ (equations 1a and 2)
    with observed values of $S_L^*$ and $\theta_j^*$, respectively
3   Return $(\hat{u}_L, \hat{u}_A)$ Game Play As shown in algorithm 1 above, L moves by selecting a strategy, $S_L^*$. A then selects an adversarial data type (perturbation strength) $\theta_j^*\sim p()$ while observing $S_L^*$. With the selected $\theta_j^*$, A may generate q adversarial queries by perturbing q clean data instances from $X^{ev}$, and sends each adversarial query, $\bar{x}$, to L. After L processes the queries, both L and A receive utilities given by equations 1 and 2, respectively. L is configured to determine $S_L^*$ without observing $\theta_j^*$ and $p()$ from A's moves. In an embodiment, L may determine $S_L^*$ using a modified Monte Carlo Tree Search (MCTS) algorithm.

Determining Strategy $S_L^*$

To calculate $S^{L*}$, L may generate different paths in the game tree to discover utilities received from different sequences of moves. To systematically explore the game tree, L may use a MCTS-like algorithm such as the TreeTraverse shown in algorithms 2 and 3. TreeTraverse works by generating a sequence of moves or game plays corresponding to a path in the game tree up to a finite cutoff depth, h. L and A's utilities from their moves may be recorded along the path and once the bottom-most level is reached, the utilities may be updated along the path upwards toward the root. In this way, moves that could lead to high utility may be identified by each player.

Algorithm 2: TreeTraverse (v)

Input: v: start node for traversal
Output: $v_{val}$: value from tree traversal (via backtracking) starting from v up to depth h
1   if $v_{depth}$ = h then
2   return
3   else if v is fully expanded then
4   $c_{val}$ ← TreeTraverse(selectBestChild(v)) // go down game tree along best action (equations 3 or 4)
5   Update $c_{val}$ ← $v_{val}$ + $c_{val}$; increment $v_{visit}$
6   return
7   else if v is visited but not expanded then
8   $\bar{c}$ ← generateAllChildren(v) // all actions
9   c ← select random child (action) from $\bar{c}$
10  $c_{val}$ ← rollout(c)
11  Update $c_{val}$ ← $v_{val}$ + $c_{val}$; increment $v_{visit}$ and $c_{visit}$
12  return $c_{val}$
13  else if v is not visited then
14  $v_{val}$ ← rollout(v)
15  Increment $v_{visit}$
16  return $v_{val}$ Algorithm 3: Rollout (v)

Input: v: start node for rollout
Output: $v_{val}$: value from tree traversal (via backtracking) starting from v up to depth h
1   if v is terminal then
2   $\hat{u}_L, \hat{u}_A$ ← gameplay ( )
3   return $\hat{u}_L, \hat{u}_A$
4   else
5   c ← select child of v prop. to $u_L$ for L's move or prop. to $p()$ for A's move
6   $c_{val}$ ← rollout(c)
7   return $c_{val}$ The key aspects of MCTS are to balance exploration and exploitation while traversing the game tree by using a heuristic function called selectBestChild (algorithm 2, line 4), and performing an operation called rollout to rapidly traverse unexplored parts of the game tree by selecting actions for each player up to the game tree's cutoff depth, h (algorithm 3). In the TreeTraverse algorithm, a heuristic function may be used for selectBestChild. While two techniques, Bayes Nash equilibrium and upper confidence bound, are described below, other techniques may be used.

In Bayes Nash equilibrium, each player may select a best response strategy that maximizes its utilities, given the possible strategies of its opponent. The strategies for L and A calculated using Bayes Nash equilibrium are given by:

$$S_L^* = \arg\max_{S_L \in \Pi(A_{C_L})} EU_L(S_L, \bar{x}, \Theta_A, p()) \tag{3}$$

$$\theta_j^* = \arg\max_{\theta_i \in \Theta_A} U_A(S_L^*, \bar{x}, \theta_i)$$

where $u_A$ is given by equation 2 and $EU_L$ is given by equation 1b with A's actual type distribution $p(\theta_i)$ replaced by L's belief distribution $\hat{p}(\theta_i)$.

Upper confidence bound is a bandit-based technique that weighs the expected utility of a move with the number of times it has been visited, so that previously unexplored or less-explored actions at a move are also tried. The upper confidence bound technique uses the following equation to calculate $S_L^*$ and $\theta_i^*$.

$$S_L^* = \arg\max_{\Pi(L_j)} \sum_{\theta_i} \left( p(\theta_i) \sum_{x \in X} U_L(L_j, \bar{x}, \theta_i) + C \sqrt{\frac{2 \ln Par_{visit}}{L_{j,visit}}} \right) \tag{4}$$

$$\theta_i^* = \arg\max_{\theta_i} \sum_{L_i} \left( \sum_{x \in X} S_L^*(L_j) U_A(L_j, \bar{x}, \theta_i) + C \sqrt{\frac{2 \ln Par_{visit}}{\theta_{i,visit}}} \right)$$

Here, C is a constant, $Par_{visit}$ is the number of times the parent node of the current node was visited, and $L_{j,visit}$ and $\theta_{i,visit}$ are the number of times the current node has been visited for L and A, respectively.

Updating Belief of A's Type Distribution

The TreeTraverse algorithm explores a sequence of moves along any single path from the root of the game tree up to the cutoff depth h. This sequence is referred to herein as a trial for the RBSG. To update its belief distribution $\hat{p}$, L uses multiple trials and, at the end of each trial, L uses an update strategy to update $\hat{p}( )$. Two example update strategies are described herein, although other strategies may be used.

One example update strategy is fictitious play, in which the probability of type $\theta_i$ is the fraction of times it was played following action $L_j$, as given by the following update rule.

$$P(\theta_i | L_j) = \arg\max_{\theta_i} \sum_{L_i} \left( \sum_{\bar{x} \in X} U_L(L_j, \bar{x}, \theta_i) + C \sqrt{\frac{2 \ln Par_{visit}}{L_{j,visit}}} \right) \tag{5}$$

Another example update strategy is Bayesian update using Bayes' rule. The Bayesian update of $\theta_i$ calculates the conditional probability of selecting $\theta_i$ when it followed $L_j$, given by the following equation, $$P(\theta_i | L_j) = \frac{P(L_j | \theta_i) P(\theta_i)}{P(L_j)} = \frac{P(L_j | \theta_i) P(\theta_i)}{\sum_{\theta_i} P(L_j | \theta_i) P(\theta_i)} \tag{6}$$

where $P(L_j|\theta_i)$ is the fraction of times $L_j$ was played following $\theta_i$, $P(L_j)$ is known to L and the denominator is a normalization term. The updated probability estimate may then be used by L to calculate expected utilities, using equations 3 and 4, for its actions to be more accurate against A in future trials. An example of the self play algorithm is as follows.

| Algorithm 4: Self Play(v) |
|---|
| 1  for $\Gamma = 1 \ldots n_{trials}$ do |
| 2      root ← L's first move with randomly selected action |
| 3      TreeTraverse(root) |
| 4.     Update $\hat{p}$ using a probability update strategy, |
|        fictitious play (equation 5) or Bayesian update (equation 6) |

Figure 2:
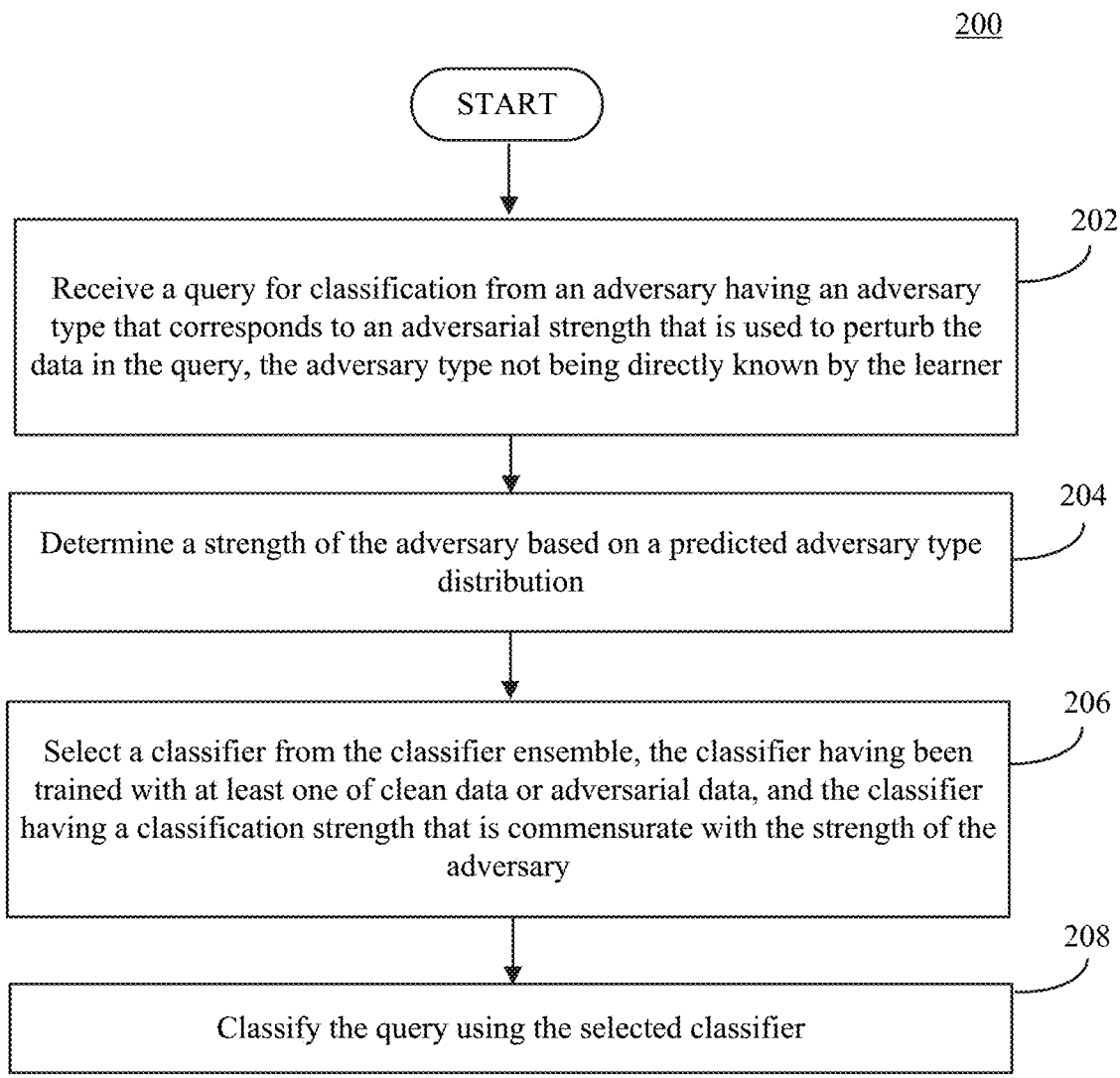
FIG. 2 depicts a flowchart for a method of operating a learner that maintains a classifier ensemble for data classification, according to an example embodiment.

Further operation aspects of system 100 of FIG. 1 will be described next in conjunction with FIG. 2. Although described with reference to system 100 of FIG. 1, the method of FIG. 2 is not so limited to that implementation. In embodiments, algorithm 1, as described above, or variations thereof may be implemented in flowchart 200. Other structural and operational embodiments will be apparent to persons skilled in the relevant art(s) based on the following.

Flowchart 200 is a method of operating a learner that maintains a classifier ensemble for data classification, according to an example embodiment. Flowchart 200 begins at step 202. At step 202, a query is received for classification from an adversary having an adversary type that corresponds to an adversarial strength that is used to perturb the data in the query, the adversary type not being directly known by the learner. In an embodiment, the query (e.g., query 114 of FIG. 1) may be received for classification by learner 102 from adversary 112. The query may be received over the Internet, from a data repository, etc. One or more than one queries (e.g., a batch of queries) may be received at a time. Adversary 112 may be of any adversary type having a corresponding adversarial strength that is used to perturb the data in the query. Adversarial data may be generated by adversary 112 by strategically adding small amounts of noise, called perturbation, to clean data. Note that while the term "adversary" is used herein, for first adversary type 118, there may be no data perturbation, and the query may be clean data having adversarial strength 0. In this case, first adversary type 118 may represent a benign client rather than an attacker. Adversarial data may have different strengths depending on the amount of perturbation that is added to the clean data to convert it into adversarial data. Adversary 112 may incur a cost that is proportional to the amount of perturbation that it added to clean data to convert it into adversarial data. The adversary type is not directly known by learner 102, and it may determine this information through different means.

In step 204, a strength of the adversary is determined based on a predicted adversary type distribution. In an embodiment, the strength of the adversary (e.g., adversary 112 shown in FIG. 1) may be determined by classifier selector 104 based on a predicted adversary type distribution. In an embodiment, classifier selector 104 is configured to predict the strength of the adversary by using a history of past received queries. That is, classifier selector 104 may estimate an adversary probability distribution over a set of types. For example, classifier selector 104 may implement a prediction technique such as fictitious play or Bayesian update as described above. The strength of the adversary is useful to determine which type of adversary most likely sent the query in order to probabilistically select a commensurate classifier. This process will be further described in reference to FIG. 3 below.

In step 206, a classifier is selected from the classifier ensemble, the classifier having been trained with at least one of clean data or adversarial data, the classifier having a classification strength that is commensurate with the determined strength of the adversary. In an embodiment, a classifier (e.g., one of first classifier 106, second classifier 108, or third classifier 110) may be selected from the classifier ensemble by classifier selector 104, which may use any means to perform the selection, such as the Bayes Nash equilibrium (equation 3) or the upper confidence bound (equation 4) technique. In an embodiment, classifier selector 104 may select a classifier based on a current belief of adversary type and adversary type distribution. In selecting a classifier that is aligned with the adversary (e.g., adversary 112), classifier selector 104 may balance multiple factors in its calculations, such as the cost spent to train the classifier, the cost to deploy (e.g., time and memory required to load the classifier into a computer's memory, or operating resources) the classifier, and losses if the classifier makes a mistake. Thus, classifier selector 104 may balance one or more factors of training the classifier, operating the classifier, and loss due to a mistaken classification by the classifier in selecting the optimal classifier for a given query.

For example, classifier selector 104 may select third classifier 110 to classify query 114 from adversary 112 because third classifier 110 is commensurate with adversary 112. Specifically, the classification strength of third classifier 110 is aligned with the adversarial strength 2 of adversary type $\theta_2$. The selection of the appropriate classifier is important as a lower strength classifier may be less capable than a higher strength classifier, but the higher strength classifier is more expensive to train and deploy. That is, a clean-data classifier may be less expensive to train and deploy than a classifier of strength 2, but such clean-data classifier may make more classification errors when given adversarial data of strength 2. In contrast, it may be excessive to deploy the classifier of strength 2 to classify clean data, as the cost for training and deploying such classifier may not be justified for clean data, especially when clean-data classifier might achieve similar performance.

Flowchart 200 ends with step 208, in which the query is classified using the selected classifier. In an embodiment, the query (e.g., query 114 shown in FIG. 1) is classified using the classifier selected in step 206. The output of the classification of the query is a label or category, called a predicted label or predicted category, such as true or false, threat or non-threat, or a range such as low, medium, or high, etc.

In an embodiment, after the query is classified, utilities may be assigned to each of learner 102 and adversary 112. The utilities may be determined using equations 1 and 2 above. The utilities and the outcome of the selected classifier (e.g., correct vs. incorrect classification), among other information, may be fed back to classifier selector 104 and used to calculate the adversarial strength of future incoming queries.

Steps 202-208 may be repeated when there are multiple queries. Note that the steps of flowchart 200 may be performed in an order different than shown in FIG. 2 in some embodiments. Furthermore, not all steps of flowchart 200 need to be performed in all embodiments.

Figure 3:
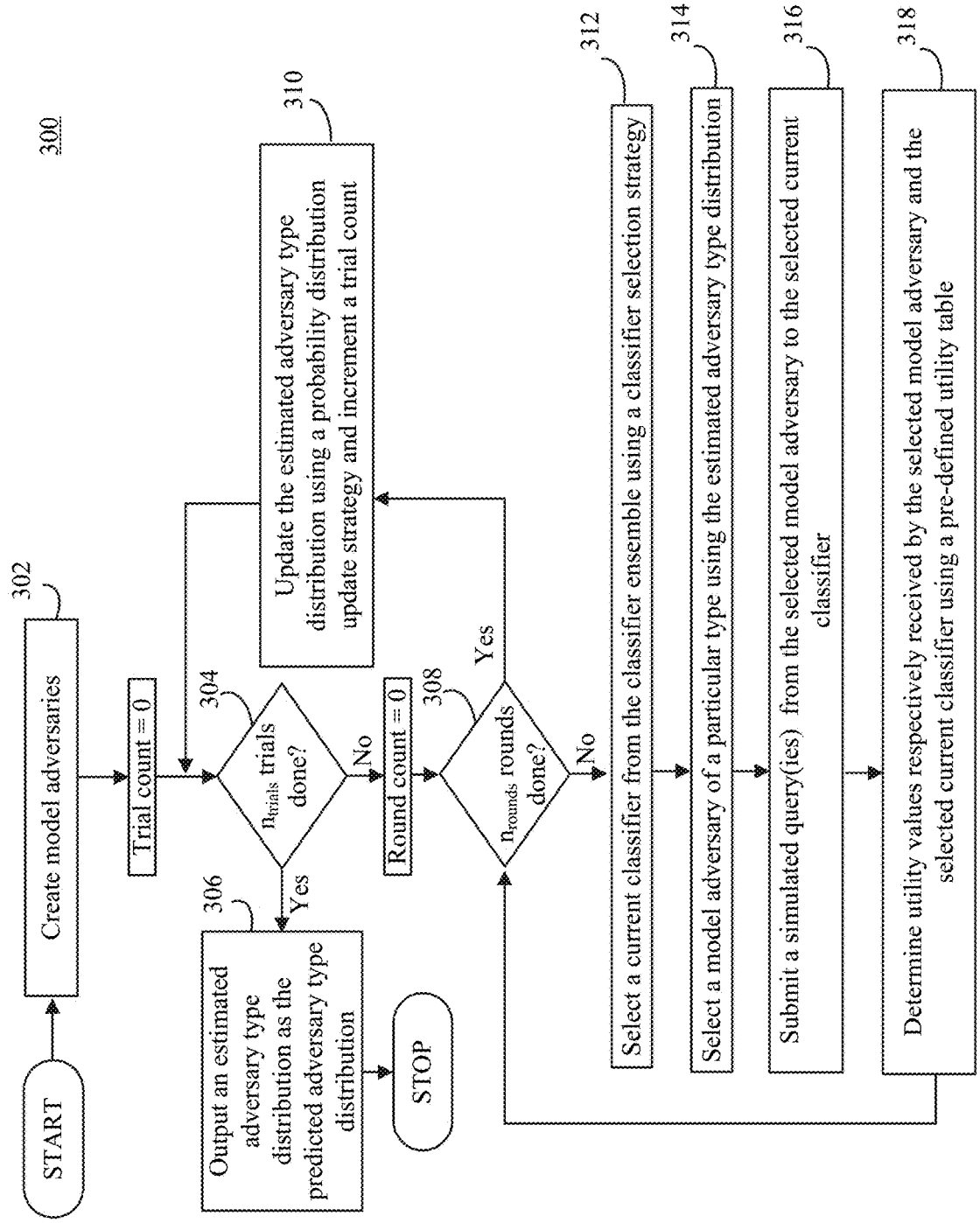
FIG. 3 depicts a flowchart for a process of an intelligent classification selector, according to an example embodiment.

The strength of the adversary may be determined in various ways. For example, FIG. 3 depicts a flowchart 300 for a process of an intelligent classification selector, according to an example embodiment. Flowchart 300 will be described with continued reference to classification system 100 of FIG. 1, although the process is not so limited to that implementation. In embodiments, algorithms 2-4, as described above, or variants thereof may be implemented in flowchart 300. Other structural and operational embodiments will be apparent to persons skilled in the relevant art(s) based on the following.

Flowchart 300 begin with step 302. In step 302, model adversaries are created. In an embodiment, classifier selector 104 shown in FIG. 1 is configured to create model adversaries, each model adversary having an adversary type that corresponds to an adversarial strength. In an embodiment, model adversaries may be created by a learner (e.g., learner 102 in FIG. 1). The model adversaries may include different adversary types (e.g., first, second, and third adversary types 118, 120, and 122, respectively, as shown in FIG. 1) having different adversarial strengths. In an embodiment, learner 102 may simulate sending queries of different strengths from one or more model adversaries to itself in a Bayesian sequential game that may include multiple trials. Thus, learner 102 may complete one or more trials of the Bayesian sequential game. The following steps may be performed for each trial of the Bayesian sequential game.

In step 304, it is determined whether a predetermined number of trials has been completed. In an embodiment, classifier selector 104 may determine whether a predetermined number of trials has been completed using a trial count, $n_{trials}$. The number of trials may depend on one or more factors, such as a size of the game tree, the number of classifier types maintained by learner 102, the number of types adversary 112 has, and the number of rounds up to which the game tree is played. For example, for a learner with 3 classifiers, 4 adversary types, with 3 rounds, 100 trials may be used. As another example, for a learner with 3 classifiers, 4 adversary types, and 5 rounds, 500 trials may be used.

In step 306, based upon determining that the predetermined number of trials has been completed, outputting an estimated adversary type distribution as the predicted adversary type distribution. In an embodiment, classifier selector 104 may determine that the predetermined number (e.g., 100 or 500) of trials has been completed, classifier selector 104 may output an estimated adversary type distribution as the predicted adversary type distribution. The predicted adversary type distribution may be utilized to determine the strength of the adversary in step 204 of flowchart 200.

Based upon determining that the predetermined number of trials has not been completed, one or more rounds of a self play game may be initiated. The following steps may be performed for each round of the self play game.

In step 308, it is determined whether a predetermined number of rounds has been completed. In an embodiment, classifier selector 104 may determine whether the number of rounds has been completed based on a round count, $n_{rounds}$. In an embodiment, the number of rounds may be the height, h, or depth of the game tree. Moreover, the value of h may be less than the frequency of change of the adversary type distribution, so that classifier selector 104 may correctly determine the adversary type distribution.

In step 310, based upon determining that the number of rounds has been completed, updating the estimated adversary type distribution using a probability distribution update strategy and incrementing a trial count. In an embodiment, classifier selector 104 may be configured to update the estimated adversary type distribution $\hat{p}()$ using a probability distribution update strategy as well as to increment a trial count for keeping track of the number of trials in the Bayesian sequential game. For example, classifier selector 104 may observe the adversary types after each round to update its belief of probability distribution of adversary types based on the observed types. Any suitable update strategy may be utilized by classifier selector 104, such as fictitious play (equation 5) or Bayesian update (equation 6) as described herein. In fictitious play, the estimated adversary type distribution may be updated using a frequency of the number of times each adversary type was selected following each classifier type during the last round (a previous round prior to the current round). With Bayesian update, the estimated adversary type distribution may be updated using Bayes' rule that uses the number of times each classifier type was selected following each adversary type and frequency of using different classifiers during the last round (a previous round prior to the current round).

In step 312, a current classifier is selected from the classifier ensemble using a classifier selection strategy. In an embodiment, classifier selector 104 may select a current classifier (e.g., third classifier shown in FIG. 1) $L_j$ from the classifier ensemble using a classifier selection strategy. That is, any of first classifier 106, second classifier 108 or third classifier 110 may be selected. For example, classifier selector 104 may select a classifier based on a heuristic function, such as Bayes Nash equilibrium (equation 3) or upper confidence bound (equation 4). For Bayes Nash equilibrium, classifier selector 104 may select a best response strategy that maximizes its utility values given the possible strategies of the adversary. Thus, classifier selector 104 may analyze the utility values for each possible pair of classifier type and adversary type (e.g., using a pre-defined utility table), and select the classifier that provides the best response strategy. With upper confidence bound, classifier selector 104 may balance exploration of a previously untried classifier for a current adversary type and exploitation of a previously tried classifier that has produced higher utility values for the current adversary type. At this point in the self play game, classifier selector 104 is in the process of determining the optimal classifier by continuously updating the classifier type-adversary type mapping. The optimal classifier for classifying a given query may be identified when the mapping process is complete.

In step 314, a model adversary of a particular type is selected using the estimated adversary type distribution. In an embodiment, classifier selector 104 may select a model adversary of a particular type using the estimated adversary type distribution $\hat{p}(\ )$. For example, given an estimated adversary type distribution (0.05, 0.05, 0.8, 0.1) over four possible types, $\{\theta_0, \theta_1, \theta_2, \theta_3\}$, classifier selector 104 may select adversary type $\theta_2$ as the most likely adversary type.

In step 316, one or more simulated queries are submitted from the selected model adversary to the selected current classifier. In an embodiment, classifier selector 104 may submit one or more simulated queries $n_q$ from the selected model adversary to the selected current classifier $L_j$.

In step 318, utility values respectively received by the selected model adversary and the selected current classifier are determined using a pre-defined utility table. In an embodiment, classifier selector 104 may determine utility values respectively received by the selected model adversary and the selected current classifier using a pre-defined utility table, such as the one shown in FIG. 4.

In an embodiment, the utility values may be determined by classifier selector 104 instead of or in addition to using a pre-defined utility table using equations 1 and 2. For example, the utility of learner 102 from using a classifier $L_j$ when the adversary type of adversary 112 is $\theta_i$ may be determined based on the product of the probability of selecting classifier $L_j$, the probability that $L_j$ performs a correct classification when the adversary type is $\theta_i$, and the value from performing the correct classification when the adversary type is $\theta_i$ less the cost of using classifier $L_j$ (equation 1a). Moreover, the expected utility of learner 102 of using any classifier when the adversary type is $\theta_i$ may be determined as a sum of equation 1a over all classifier types (equation 1b). Furthermore, learner 102 expected utility may be determined as a sum of equation 1b over all adversary types.

In an embodiment, the utility of adversary 112 with adversary type $\theta_i$ when learner 102 uses classifier $L_j$ may be determined based on the product of the probability of learner 102 selecting $L_j$, the probability that $L_j$ performs an incorrect classification when the adversary type is $\theta_i$, and the value of the incorrect classification when the adversary type is $\theta_i$ less the cost of using adversary type $\theta_i$ (equation 2). The utility for adversary 112 from using type $\theta_i$ is the sum of equation 2 over all classifier types.

FIG. 4 depicts a predefined utility table 400 according to an example embodiment. Table 400 includes four sub-tables, 402, 404, 406, and 408. Each sub-table corresponds to a combination of the correct or mistaken classification by a classifier and the consequence (low or high) of a classification. Thus, sub-table 402 corresponds to the combination of the classifier making a mistake and the mistake consequences are low (e.g., legitimate software quarantined as malware). Sub-table 404 corresponds to the combination of the classifier making a mistake, and the mistake consequences are high (e.g., malware mistaken as legitimate software and allowed access to high security system). Sub-table 406 corresponds to the combination of the classifier making the correct classification, and gets a usual (small) reward (e.g., malware identified as malware). Sub-table 408 corresponds to the combination of the classifier making the correct classification and gets usual (small) reward, (e.g., legitimate software identified as legitimate software. In each sub-table, the header row includes the classifier types, 0, 1 or 2, and the leftmost column includes the adversary types of 0, 1, 2, or 3. The sub-tables include utility values for each pair of classifier type and adversary type. The utility values are designed in such a way that the highest utility occurs when the classifier type matches the adversary type. These occurrences are indicated in bolded cells along the diagonals of each sub-table in table 400. Table 400 illustrates a scenario where the number (3) of classifier types is fewer than the number (4) of adversary types. The utility values are highest when the strongest adversary type (type 3 in each sub-table bottommost row) is matched with the strongest classifier type (type 2 in each sub-table rightmost row).

Before learner 102 is deployed for classifying data, the classifier ensemble of learner 102 may be individually trained with clean or perturbed data. Such training process may be implemented in various ways.

Figure 5:
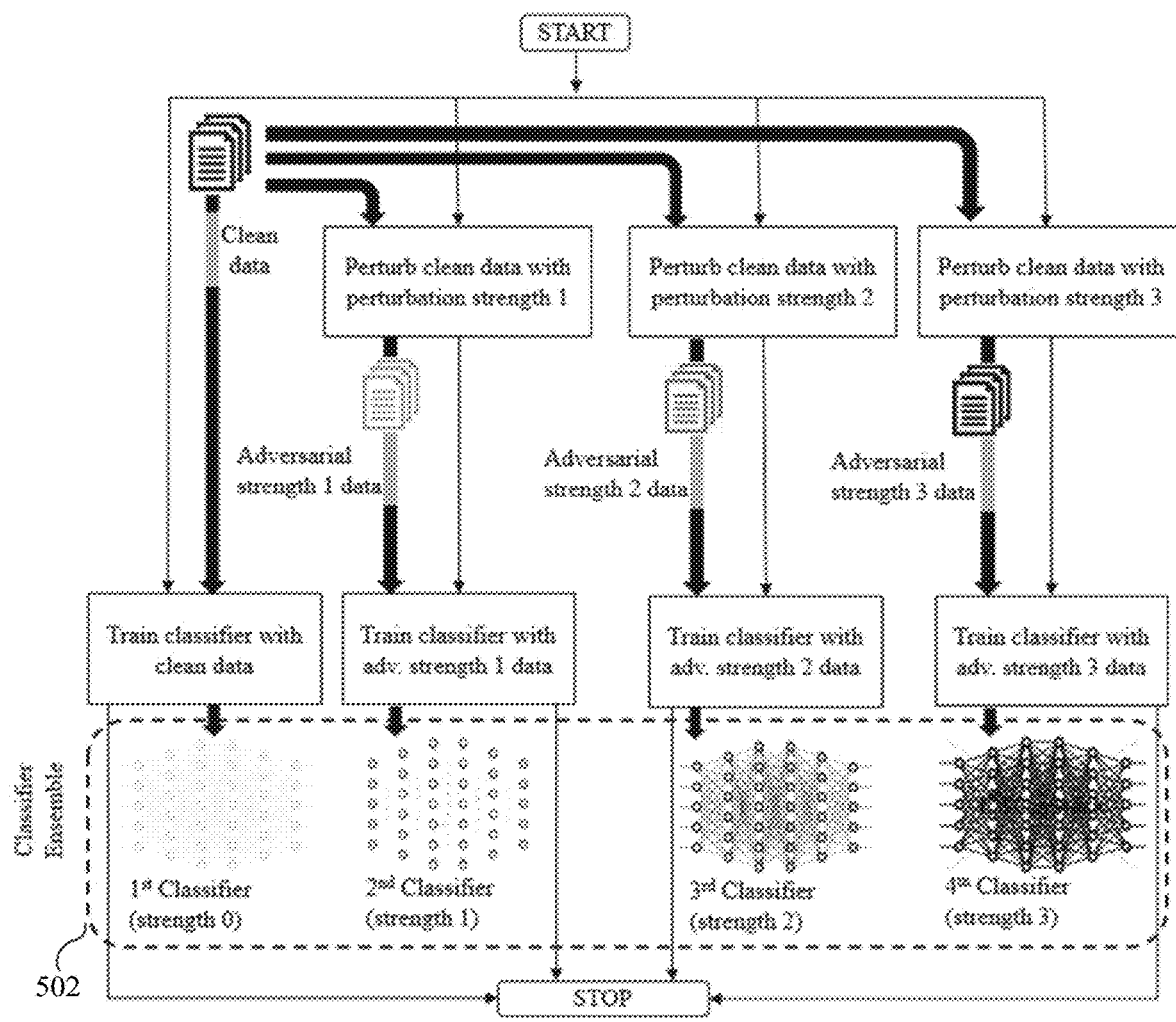
FIG. 5 depicts a data flow for a training process for a classifier ensemble, according to an example embodiment.

FIG. 5 depicts a data flow for a training process for the classification system of FIG. 1, according to an example embodiment. For instance, the classifier ensemble of learner 102 may be implemented as classifier ensemble 502 and trained as shown in FIG. 5. In FIG. 5, the training process begins with clean data, which may be perturbed with various perturbation strength, for example, perturbation strength 1, perturbation strength 2, and perturbation strength 3 resulting in adversarial strength 1 data, adversarial strength 2 data, and adversarial strength 3 data. Clean data that has not been perturbed may be considered adversarial strength 0 data. Each classifier in classifier ensemble 502 may be trained with one type of data. For example, first classifier may be trained with clean data, and is thus a classifier with classification strength 0. Second, third and fourth classifiers may be respectively trained with adversarial strength 1, 2 and 3 data. Accordingly, second, third and fourth classifiers are classifiers with classification strength 1, 2, and 3, respectively. While four classifiers are depicted in FIG. 5, more or fewer classifiers may be included in classifier ensemble 500.

Figure 6:
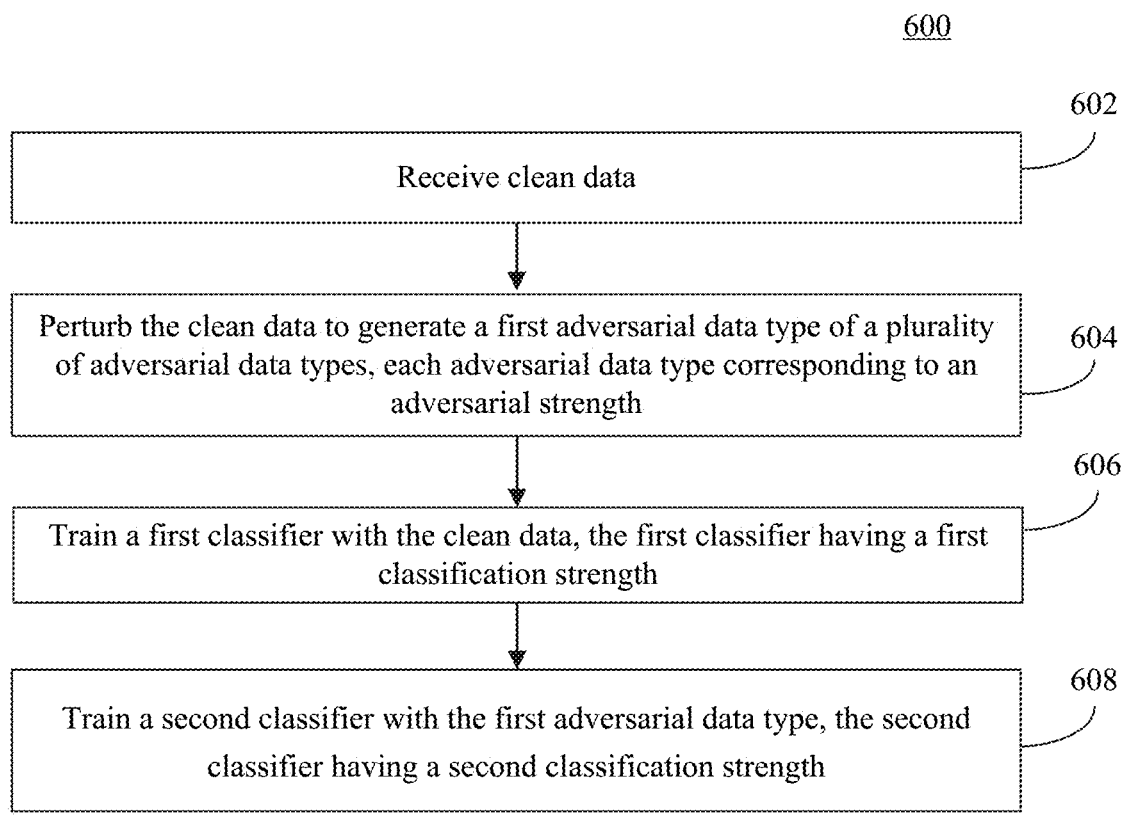
FIG. 6 depicts a flowchart for a training process for the classification system of FIG. 1, according to an example embodiment.

Further aspects of classification system 100 of FIG. 1 will now be discussed in conjunction with FIG. 6. FIG. 6 depicts a flowchart 600 of an example method for training a classifier ensemble, according to an embodiment. Although described with reference to classification system 100 of FIG. 1, the method of FIG. 6 is not limited to that implementation. Other structural and operational embodiments will be apparent to persons skilled in the relevant art(s) based on the following discussion regarding classification system 100 of FIG. 1.

Flowchart 600 begins at step 602, in which clean data is received. For example, and with reference to system 100 of FIG. 1, clean data may be received at the classifier ensemble of learner 102 during a training stage. The clean data may be in any format, depending on the application of classification system 100. For example, clean data may include text, images, videos, files, etc. In an embodiment, the clean data may be in a format appropriate for training the classifier ensemble. In another embodiment, the clean data may be manipulated by learner 102 to a format suitable for training the classifier ensemble.

In step 604, the clean data is perturbed to generate a first adversarial data type of a plurality of adversarial data types, each adversarial data type corresponding to an adversarial strength. For example, the clean data may be perturbed as shown in FIG. 5. In an embodiment, learner 102 may be configured to perturb the clean data to generate the different adversarial data types in order to train the classifier ensemble. In another embodiment, the clean data may be perturbed by another entity and provided to learner 102 for training.

In step 606, a first classifier is trained with the clean data, the first classifier having a first classification strength. In an embodiment, a first classifier (e.g., first classifier 106 shown in FIG. 1) may be trained with clean data, which may also be considered adversarial data of strength 0.

In step 608, a second classifier is trained with the first adversarial data type, the second classifier having a second classification strength. In an embodiment, a second classifier (e.g., second classifier 108 shown in FIG. 1 or second classifier shown in FIG. 5) may be trained with adversarial data having strength 1.

This training process may continue with all of the classifiers in the classifier ensemble until each classifier is individually trained with a different type of adversarial data. The training process may be considered complete when the number of errors the classifier ensemble makes in classifying test data is substantially low. That is, the classifier ensemble may be ready for deployment with its accuracy level is at a desired level when classifying test data. The goal is for the classifier ensemble, once deployed, to classify unlabeled data instances with a similar degree of accuracy as achieved for the test data instances during training.

Figure 7:
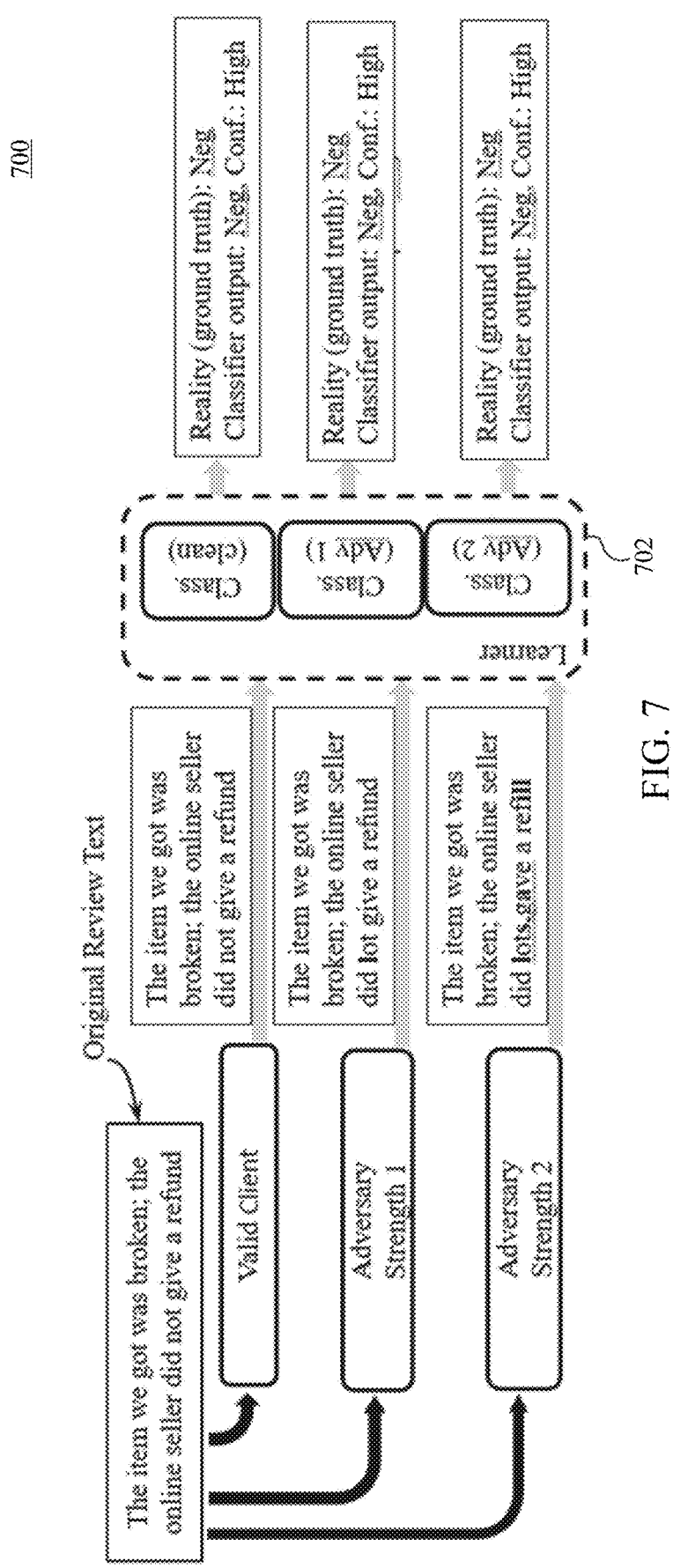
FIG. 7 is a diagram showing training examples for a learner, according to an example embodiment.

An example of clean and perturbed data that may be used for training process is provided. FIG. 7 is a diagram showing training examples for a classification system 700 that includes learner 702, according to an example embodiment. As shown in FIG. 7, a clean data instance includes a textual review: "The item we got was broken; the online seller did not give a refund." From a valid client, such textual review would not be perturbed, and thus the original review text would be sent as a query to learner 702 having a classifier ensemble of three classifiers as shown in FIG. 7. An adversary of strength 1 may perturb the clean data instance such that it would become, for example, "The item we got was broken; the online seller did lot give a refund." And an adversary of strength 2 may perturb the clean data instance to generate, for example, "The item we got was broken; the online seller did lots, gave a refill." Here, the perturbation function changes the clean data instance by one to a few characters at a time, strategically, to misguide the learner. The perturbation of the clean data is strategic by changing characters that may cause the most confusion. If a clean data instance is modified too much, then it becomes very obvious that the data instance is not valid or that it has been tampered with. In an embodiment, perturbing the clean data includes perturbing the clean data according to a single character gradient technique that replaces a character with a most negative gradient with a character with a least positive gradient, wherein multiple iterations of the technique generate adversarial data types with increasing adversarial strength.

As shown in FIG. 7, learner 702 has a classifier ensemble that includes three classifiers that has been respectively trained with clean data, adversarial data of strength 1, and adversarial data of strength 2. Thus, the classifiers have increasing classification strengths of 0, 1 and 2, where classification strength 2 is greater than classification strength 1, which is greater than classification strength 0. Accordingly, the classifier with classification strength 2 may be configured to classify a particular query with a higher confidence level than the classifier with classification strength 1 or 0. However, the classifier with classification strength 2 may be configured to be more complex, and requires more training time and training resources than the classifiers with classification strength 1 or 0.

After the classifier ensemble is adequately trained, learner 702 may be deployed to classify data. That is, after training, learner 702 is configured to select the appropriate classifier for a given query by selecting the classifier that is commensurate with the adversary strength of the adversary that generated the query. Thus, for example, the clean data query from the valid client may be best classified by the classifier trained with clean data. Such classifier may generate an output of "negative" with a "high" confidence, which is correct as the ground truth label is negative, indicating that the review is a negative review. The query from the adversary having strength 1 may be most appropriate for the classifier trained with adversarial data of strength 1 to classify and generate the correct output of "negative" with a "high" confidence. Moreover, the query from the adversary having strength 2 may be best suited for the classifier trained with adversarial data of strength 2 to classify and generate the correct output of "negative", also with a "high" confidence.

Additional Embodiments

As a specific example, in an embodiment, the RBSG with self play based adversarial learning technique for a binary classification task with text data using a Yelp® review polarity data set may be implemented as follows. Each data instance of the Yelp® review data set has either of two labels, 1 (negative) and 2 (positive). The clean training and test sets have 560,000 and 38,000 samples, respectively. The learner (L) is implemented as a Character Convolutional Neural Network (CharCNN) model that includes 5 convolution layers followed by 3 fully connected layers is used. The convolution layers are used to identify character level features to classify text.

For generating adversarial text, a single character gradient based replacement technique may be employed. Given a data instance in the form of a text character string as input to the learner, the method works by classifying the text using the model and calculating the gradient of the loss function for each character in the input text. It then replaces the character with the most negative gradient (most influential on the classifier output) in the txt with the character that has the least positive gradient (least influential on the classifier output). This technique may be used iteratively on a data instance to replace multiple characters in the text and create adversarial text with different attack strengths, e.g., two iterations of the technique yields adversarial text with perturbation strength 2.

This embodiment may be implemented by a computer, for example, one with the following processors, 20 dual core, 2.3 GHz Intel Xeon central processing units with an Nvidia Tesla K40C graphics processing unit. The RBSG self play code may be implemented in Python 2.7, and the CharCNN and adversarial text generation code may be implemented with Tensorflow 1.11 for building and training their deep network models. These components are merely examples, and other hardware and software may be used in other embodiments.

The CharCNN may be trained with clean data first, and then hardened separately with two adversarial training data sets that include 200,000 adversarial training samples of perturbation strengths 1 and 2, respectively. This results in three classifiers for the learner with increasing hardening levels, denoted by $L_0$, $L_1$, $L_2$. The accuracies of these classifiers may be evaluated with 50,000 instances of test data of perturbation strengths 1, 2, and 3 each, as shown in Table 1 below.

TABLE 1

Testing accuracy of individual classifiers with different hardening levels (columns) on adversarial test data with different perturbation strengths (rows)

|  | $L_0$ | $L_1$ | $L_2$ |
|---|---|---|---|
| Clean | 0.9392 | 0.9426 | 0.94 |
| Adv 1 | 0.8684 | 0.88 | 0.8782 |
| Adv 2 | 0.7706 | 0.7922 | 0.8152 |
| Adv 3 | 0.6814 | 0.7056 | 0.7502 |

Adversary (A) generates queries with either clean data or adversarial data with perturbation strengths 1, 2, and 3, giving $\Theta_A = \{\theta_0, \theta_1, \theta_2, \theta_3\}$. L uses three classifiers, thus $Ac_L = \{L_0, L_1, L_2\}$. The different parameters used in this embodiment includes cutoff depth in self play, h=20; number of trials in self play, $n_{trials}$=10; batch size for queries sent by A to L, q=10; and constant in upper confidence bound calculation (equation 4), C=2.

To determine whether L, using the self play algorithm, could effectively deploy appropriate classifiers for data of different perturbation strengths, four different type distributions for data generated by A may be created. Each distribution has 98% of one of the four types $\{\theta_0, \theta_1, \theta_2, \theta_3\}$. L may use either Bayes Nash equilibrium (equation 3) or upper confidence bound (equation 4) to select actions in the game tree during self play. The results are shown in Table 2.

TABLE 2

Percentage of different classifiers used and accuracies (columns) obtained for clean and adversarial data of different perturbation strengths (rows). Data in the top and bottom tables are with upper confidence bound (UCB) and Bayes Nash equilibrium (BNE), respectively, for action selection during self play.

|  | $L_0$ | $L_1$ | $L_2$ | Acc. |
|---|---|---|---|---|
| UCB |  |  |  |  |
| Clean | 43.75% | 29.46% | 26.79% | 0.9321 |
| Adv 1 | 39.65% | 24.13% | 36.21% | 0.8716 |
| Adv 2 | 24.11% | 25% | 50.89% | 0.8062 |
| Adv 3 | 39.81% | 20.37% | 39.81% | 0.7222 |
| BNE |  |  |  |  |
| Clean | 57.56% | 10.37% | 32.07% | 0.9302 |
| Adv 1 | 33.91% | 46.96% | 19.13% | 0.867 |
| Adv 2 | 29.46% | 27.68% | 42.86% | 0.808 |
| Adv 3 | 31.53% | 32.43% | 36.04% | 0.709 |

As shown in Table 2, both UCB and BNE metric for action selection perform comparably. The accuracy obtained using the RBSG based self play technique on clean and adversarial data perturbed with different perturbation strengths (last column of Table 2) is not degraded and comparable to the best accuracies obtained with the commensurately hardened classifier, $L_2$, when used individually (column 4 of Table 1). The RBSG with self play technique is also able to align adversarial data of different perturbation strengths with the commensurately hardened classifier, as shown by the maximum percentage of each row shown by the maximum percentage of each row in Table 1 corresponding to the classifier hardened with adversarial data of that perturbation strength. Note that with adversarial data of perturbation strength 3, Adv 3, the classifiers are selected almost uniformly. This is because none of the classifiers $L_0$, $L_1$ or $L_2$ were trained with adversarial data of perturbation strength 3. $L_2$, which has the highest individual accuracy for Adv 3 data, is used most frequently, albeit marginally, for Adv 3 data in Table 3. The self play technique also strategically uses $L_0$ and $L_1$, each of which incurs lower costs to deploy than $L_2$. Consequently, the utility obtained by the learner with self play is better than its utility while using individual classifier $L_2$ only.

Figure 8:
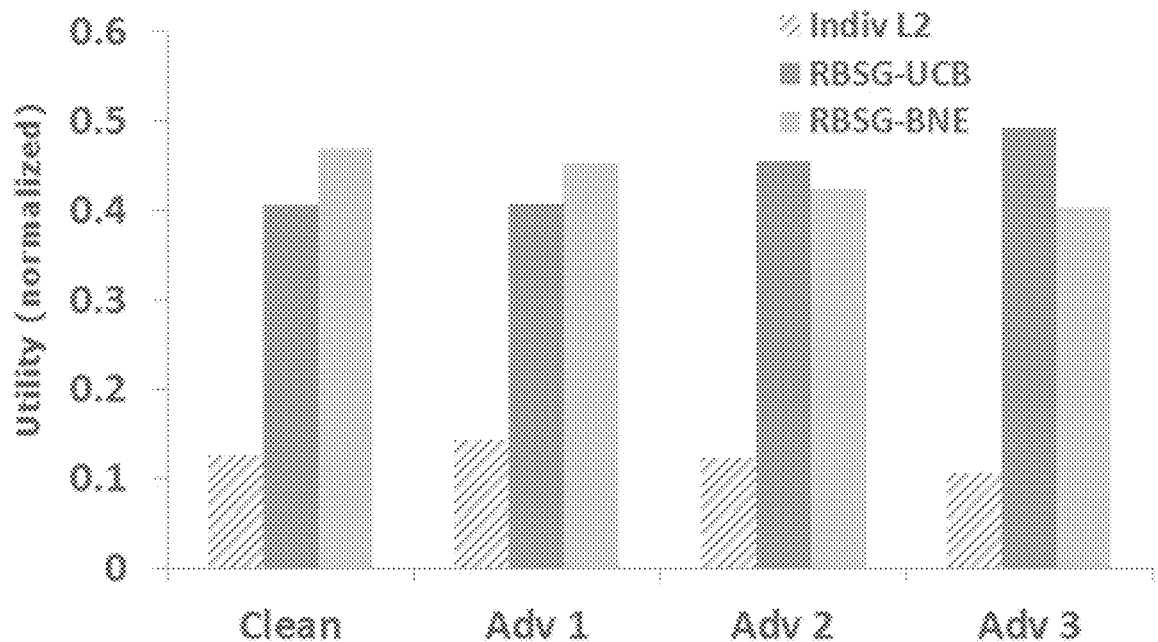
FIG. 8 is a bar graph showing relative utilities obtained by an individual classifier, according to an example embodiment.

FIG. 8 is a bar graph showing relative utilities obtained by the individual classifier $L_2$. FIG. 8 shows a comparison of the relative utilities obtained by the learner while using RBSG with self play (shown as RBSG-UCB (upper confidence bound) or RBSG-BNE (Bayes Nash equilibrium) in FIG. 8), versus the utilities obtained while using the most hardened individual classifier $L_2$ (shown as Indiv L2 in FIG. 8). As depicted in FIG. 8, the RBSG with self play technique improves utilities as it deploys lower cost classifiers, $L_0$ and $L_1$, along with $L_2$ while aligning the expected perturbation strength of the query data, estimated via p̂, with the commensurately hardened classifier.

The convergence of L's belief distribution p̂( ) to A's actual type distribution p( ) using the fictitious play (equation 5) and Bayesian update probability update (equation 6) strategies. Results may be averaged, e.g., over 10 runs. For each run, p( ) may be selected as a random distribution. The Kullback-Liebler (KL) divergence between p̂( ) and p( ), given by the following equation, is shown in FIG. 9.

$$D_{KL}(\hat{p}||p) = \sum_{\theta_i \in \Theta_A} p(\theta_i) \ln \frac{\hat{p}(\theta_i)}{p(\theta_i)} \qquad (7)$$

Figure 9:
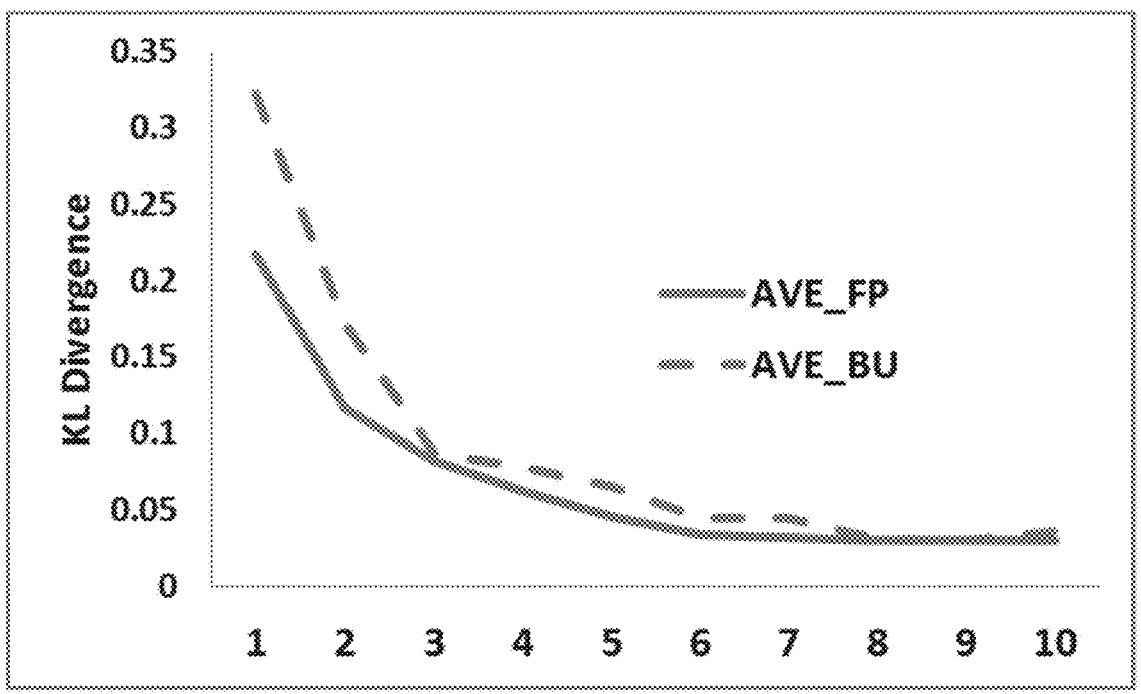
FIG. 9 is a chart showing a Kullback-Liebler divergence between an adversary's actual type distribution and a learner's belief distribution, according to an example embodiment.

FIG. 9 is a chart showing the Kullback-Liebler divergence between the adversary's actual type distribution and the learner's belief distribution. As shown in FIG. 9, both strategies p̂ is able to converge to within 5% of p( ) within about 6 trials. Fictitious play (shown as AVE_FP in FIG. 9), converges faster with higher KL divergence values while Bayesian update (shown as AVE_BU in FIG. 9) takes a longer time to converge owing to its more complex calculations.

In another embodiment, rather than assuming that the learner reveals its classifier to the adversary, the adversary may be able to reverse engineer the learner's classifiers, but it is not aware of the frequency with which the learner deploys them. The adversary may then also build a model of the learner via repeated interactions to determine its perturbation strength strategically.

For the Bayes Nash equilibrium calculation, the players are assumed to always behave rationally. However, the adversary may behave myopically and select a greedy outcome, or adopt suboptimal low and slow strategies to misguide the learner. Accordingly, other techniques, such as regret-based techniques, or safety value exploitability of opponents may be used instead of Bayes Nash equilibrium based strategy selection in an embodiment.

In yet another embodiment, it may be possible to integrate reinforcement learning for the adversarial learning setting to improve classification.

The example embodiments described herein are provided for illustrative purposes and are not limiting. Further structural and operational embodiments, including modifications/alterations, will become apparent to persons skilled in the relevant art(s) from the teachings herein.

Example Computer System Implementation

Each of learner 102, adversary 112, classifier ensemble 502, and classifier ensemble 702 and flowcharts 200, 300 and 600 may be implemented in hardware, or hardware combined with software or firmware. For example, learner 102, adversary 112, classifier ensemble 502, and classifier ensemble 702, and flowcharts 200, 300 and 600 may be implemented as computer program code/instructions configured to be executed in one or more processors and stored in a computer readable storage medium. Alternatively, learner 102, adversary 112, classifier ensemble 502, and classifier ensemble 702, and flowcharts 200, 300 and 600 may be implemented as hardware logic/electrical circuitry.

The terms "computer program medium," "computer-readable medium," and "computer-readable storage medium" are used herein to refer to physical hardware media such as the hard disk associated with a storage device. Such computer-readable storage media are distinguished from and non-overlapping with communication media (do not include communication media). Communication media embodies computer-readable instructions, data structures, program modules or other data in a modulated data signal such as a carrier wave. The term "modulated data signal" means a signal that has one or more of its characteristics set or changed in such a manner as to encode information in the signal. By way of example, and not limitation, communication media includes wireless media such as acoustic, RF, infrared and other wireless media, as well as wired media. Embodiments directed to such communication media are separate and non-overlapping with embodiments directed to computer-readable storage media.

In an embodiment, learner 102, adversary 112, classifier ensemble 502, and classifier ensemble 702 may be implemented in a system-on-a-chip (SoC). The SoC may include an integrated circuit that includes one or more of a processor (e.g., a central processing unit (CPU), microcontroller, microprocessor, digital signal processor (DSP), etc.), memory, one or more communication interfaces, and/or further circuits, and may optionally execute received program code and/or include embedded firmware to perform functions.

Figure 10:
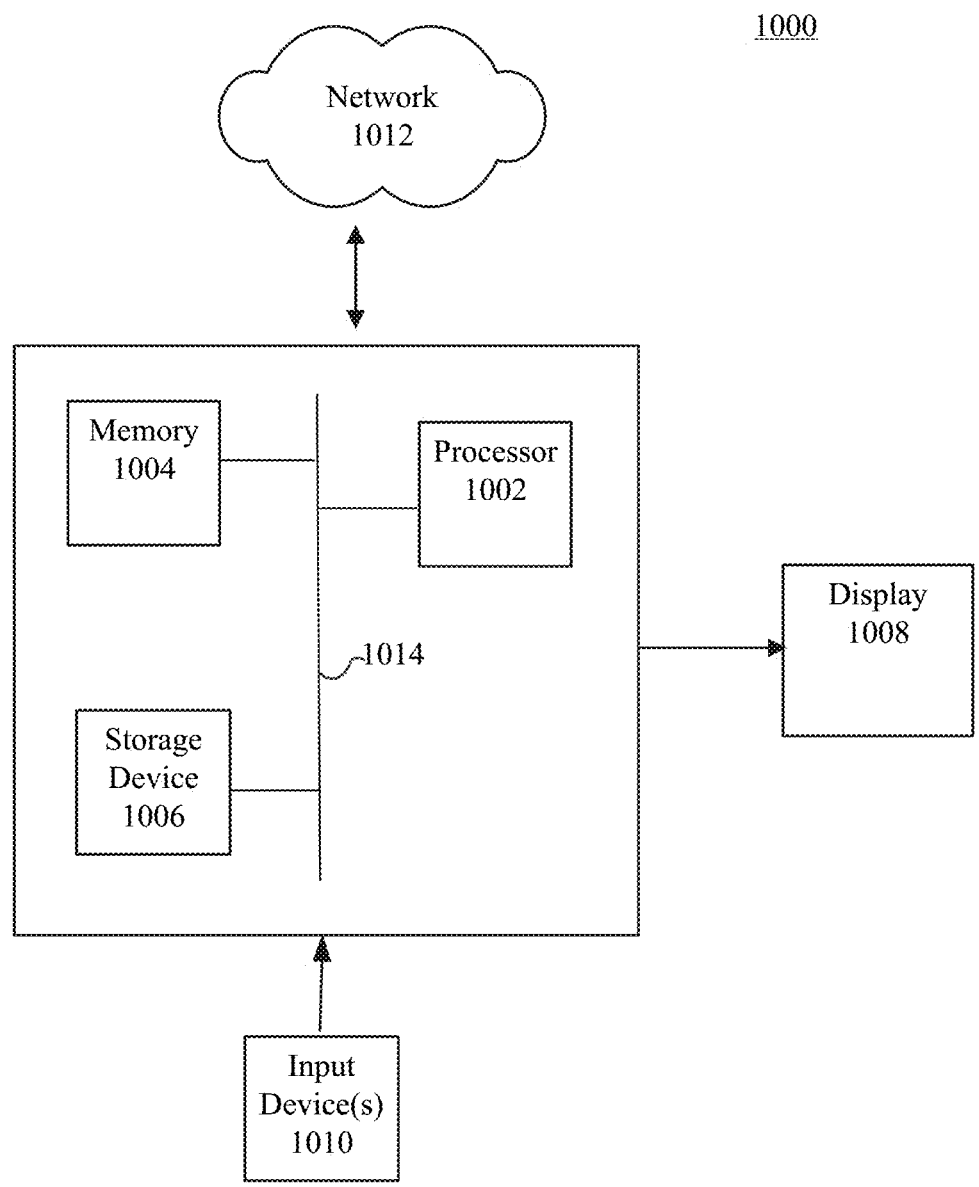
FIG. 10 is a block diagram of an example computer system in which embodiments may be implemented.

FIG. 10 is a block diagram of an example computer system in which embodiments may be implemented. The description of computing device 1000 is provided for purposes of illustration, and is not intended to be limiting. Embodiments may be implemented in further types of computer systems, as would be known to persons skilled in the relevant art(s). Embodiments described herein may be implemented on virtually any type of computer regardless of the platform being used.

As shown in FIG. 10, computing device 1000 includes processor 1002, memory 1004, and storage device 1006. These components may be coupled together via a bus 1014.

Processor 1002 may be referred to as a processor circuit or a processing unit. Processor 1002 is an electrical and/or optical circuit implemented in one or more physical hardware electrical circuit device elements and/or integrated circuit devices (semiconductor material chips or dies) as a central processing unit (CPU), a microcontroller, a microprocessor, and/or other physical hardware processor circuit. Processor 1002 may execute program code stored in a computer readable medium, such as program code of an operating system, an application program, and other programs.

Memory 1004 includes any system memory, for example, read only memory (ROM) and random access memory (RAM) and may store a basic input/output system (e.g., BIOS).

Storage device 1006 may include any a hard disk drive, a magnetic disk drive, an optical disk drive, a removable optical disk (e.g., CD ROM, DVD ROM), a flash memory card, a digital video disk, RAMs, ROMs, or other hardware storage media. Storage device 1006 and its associated computer readable media provide nonvolatile storage of computer-readable instructions, data structures, program modules and other data for computing device 1000.

A number of program modules may be stored on memory 1004 and/or storage device 1006. These programs include an operating system, an application program, other programs, and program data. Such an application program or other programs may include, for example, computer program logic (e.g., computer program code or instructions) for implementing system components and/or embodiments described herein.

A user may enter commands and information into the computing device 1000 through input devices 1010 such as a keyboard and a pointing device. Other input devices (not shown) may include a microphone, joystick, game pad, satellite dish, scanner, touch screen and/or touch pad, voice recognition system to receive voice input, gesture recognition system to receive gesture input, or the like. These and other input devices are often connected to processor 1002 through a serial port interface that is coupled to bus 1014, but may also be connected by other interfaces, such as a parallel port, game port, or a universal serial bus (USB).

A display 1008 is also connected to bus 1014 via an interface, such as a video adapter. Display 1008 may be external to or incorporated in computing device 1000. Display 1008 may display information, as well as being a user interface for receiving user commands and/or other information (e.g., by touch, finger gestures, virtual keyboard, etc.). In addition to display 1008, computing device 1000 may include other peripheral output devices (not shown) such as speakers and printers.

Computing device 1000 is connected to a network 1012 (e.g., the Internet) through an adaptor or network interface, a modem, or other means for establishing communications over the network.

CONCLUSION

While various embodiments of the disclosed subject matter have been described above, it should be understood that they have been presented by way of example only, and not limitation. Various modifications and variations are possible without departing from the spirit and scope of the embodiments as defined in the appended claims. Accordingly, the breadth and scope of the disclosed subject matter should not be limited by any of the above-described exemplary embodiments, but should be defined only in accordance with the following claims and their equivalents.

What is claimed is:

1. A method for operating a learner that maintains a classifier ensemble for data classification, the method comprising:
    receiving a query for classification from an adversary having an adversary type that corresponds to an adversarial strength that is used to perturb the data in the query, the adversary type not being directly known by the learner;
    determining a strength of the adversary based on a predicted adversary type distribution, wherein the determining the strength of the adversary comprises:
        completing one or more trials of a Bayesian game, and based upon determining that a predetermined number of trials has not been completed, initiating one or more rounds of a self play game;
    selecting a classifier from the classifier ensemble, the classifier having been trained with at least one of clean data or adversarial data, and the classifier having a classification strength that is commensurate with the determined strength of the adversary; and
    classifying the query using the selected classifier.

2. The method of claim 1, wherein the determining the strength of the adversary comprises:
    creating model adversaries, each model adversary having an adversary type that corresponds to an adversarial strength; and
    wherein, for each trial, completing each of the one or more trials of the Bayesian game comprises:
        determining whether the predetermined number of trials has been completed, and
        based upon determining that the predetermined number of trials has been completed, outputting an estimated adversary type distribution as the predicted adversary type distribution.

3. The method of claim 2, further comprising:
    based upon determining that the predetermined number of trials has not been completed, for each round:
        determining whether a predetermined number of rounds has been completed, and
        based upon determining that the number of rounds has been completed, updating the estimated adversary type distribution using a probability distribution update strategy and incrementing a trial count.

4. The method of claim 3, further comprising:
    based upon determining that the predetermined number of rounds has not been completed, for each round:
        selecting a current classifier from the classifier ensemble using a classifier selection strategy;
        selecting a model adversary of a particular type using the estimated adversary type distribution;
        submitting one or more simulated queries from the selected model adversary to the selected current classifier;
        determining utility values respectively received by the selected model adversary and the selected current classifier using a pre-defined utility table; and
        incrementing a round count.

5. The method of claim 4, wherein the classifier selection strategy comprises a Nash equilibrium strategy that analyzes the utility values for each possible pair of classifier type and adversary type and selects the classifier as a best response strategy.

6. The method of claim 4, wherein the classifier selection strategy comprises an upper confidence bound strategy that balances exploration of a previously untried classifier for a current adversary type and exploitation of a previously tried classifier that has produced higher utility values for the current adversary type.

7. The method of claim 4, wherein the utility table comprises a plurality of sub-tables, each sub-table corresponding to a combination of a correct or mistaken classification by a classifier and a consequence of the classification, the consequence being high consequence or low consequence.

8. The method of claim 4, wherein the utility table comprises utility values that are configured such that the highest utility value occurs when a classifier type matches an adversary type.

9. The method of claim 3, wherein the probability distribution update strategy comprises a fictitious play strategy that updates the estimated adversary type distribution based on a frequency of a number of times each adversary type was selected following each classifier type during a last round of the self play game.

10. The method of claim 3, wherein the probability distribution update strategy comprises a Bayesian update strategy that updates the estimated adversary type distribution based on a number of times each classifier type is selected following each adversary type and a frequency of using different classifiers during a last round of the self play game.

11. The method of claim 2, wherein selecting the classifier from the classifier ensemble comprises balancing one or more factors of training the classifier, operating the classifier, and loss due to a mistaken classification by the classifier.

12. The method of claim 1, wherein the determining the strength of the adversary comprises:
    creating model adversaries, each model adversary having an adversary type that corresponds to an adversarial strength.

13. The method of claim 1, wherein, for each trial, completing each of the one or more trials of the Bayesian game comprises:
    outputting an estimated adversary type distribution as the predicted adversary type distribution.

14. A system, comprising:
    a processor; and
    memory that stores computer program logic for execution by the processor, the computer program logic comprising instructions for:
        receiving a query for classification from an adversary having an adversary type that corresponds to an adversarial strength that is used to perturb the data in the query, the adversary type not being directly known by the learner, determining a strength of the adversary based on a predicted adversary type distribution, wherein the determining the strength of the adversary comprises:
  completing one or more trials of a Bayesian game, and
  based upon determining that a predetermined number of trials has not been completed, initiating one or more rounds of a self play game;

selecting a classifier from the classifier ensemble, the classifier having been trained with at least one of clean data or adversarial data, and the classifier having a classification strength that is commensurate with the determined strength of the adversary, and classifying the query using the selected classifier.

15. The system of claim 14, wherein the computer program logic further comprises instructions for:

creating model adversaries, each model adversary having an adversary type that corresponds to an adversarial strength; and wherein, for each trial, completing each of the one or more trials of the Bayesian game comprises:
  determining whether the predetermined number of trials has been completed, and
  based upon determining that the predetermined number of trials has been completed, outputting an estimated adversary type distribution as the predicted adversary type distribution.

16. The system of claim 15, wherein the computer program logic further comprises instructions for:

based upon determining that the predetermined number of trials has not been completed, for each round:
  determining whether a predetermined number of rounds has been completed, and
  based upon determining that the number of rounds has been completed, updating the estimated adversary type distribution using a probability distribution update strategy and incrementing a trial count.

17. The system of claim 16, wherein the computer program logic further comprises instructions for:

based upon determining that the predetermined number of rounds has not been completed, for each round:
  selecting a current classifier from the classifier ensemble using a classifier selection strategy;
  selecting a model adversary of a particular type using the estimated adversary type distribution;
  submitting one or more simulated queries from the selected model adversary to the selected current classifier;
  determining utility values respectively received by the selected model adversary and the selected current classifier using a pre-defined utility table; and
  incrementing a round count.

18. The system of claim 17, wherein the classifier selection strategy comprises a Nash equilibrium strategy that analyzes the utility values for each possible pair of classifier type and adversary type and selects the classifier as a best response strategy.

19. The system of claim 16, wherein the probability distribution update strategy comprises a fictitious play strategy that updates the estimated adversary type distribution based on a frequency of a number of times each adversary type was selected following each classifier type during a last round of the self play game.

20. The system of claim 16, wherein the probability distribution update strategy comprises a Bayesian update strategy that updates the estimated adversary type distribution based on a number of times each classifier type is selected following each adversary type and a frequency of using different classifiers during a last round of the self play game.

* * * * *